United States Patent
Ling et al.

(10) Patent No.: US 10,871,417 B2
(45) Date of Patent: Dec. 22, 2020

(54) LEAK DETECTION SYSTEM WITH ELECTRONICS COMPONENT

(71) Applicant: SAINT-GOBAIN PERFORMANCE PLASTICS CORPORATION, Solon, OH (US)

(72) Inventors: Gerald H. Ling, Ardmore, PA (US); Jian L. Ding, Stow, MA (US); Sarah L. Clark, Somerville, MA (US); Paul Braun, Providence, RI (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 16/442,822

(22) Filed: Jun. 17, 2019

(65) Prior Publication Data

US 2019/0301965 A1    Oct. 3, 2019

Related U.S. Application Data

(62) Division of application No. 15/194,850, filed on Jun. 28, 2016, now Pat. No. 10,365,178.

(60) Provisional application No. 62/186,853, filed on Jun. 30, 2015.

(51) Int. Cl.
 *G01M 3/04* (2006.01)
 *G01M 3/16* (2006.01)

(52) U.S. Cl.
 CPC ............ *G01M 3/045* (2013.01); *G01M 3/165* (2013.01)

(58) Field of Classification Search
 CPC .............................. G01M 3/045; G01M 3/165
 USPC .......................................................... 73/40
 See application file for complete search history.

(56) References Cited

U.S. PATENT DOCUMENTS

| | | | |
|---|---|---|---|
| 2,372,489 A | 7/1943 | Hampson | |
| 3,938,116 A | 2/1976 | Schneider | |
| 4,270,049 A | 5/1981 | Tanaka et al. | |
| 4,695,787 A | 9/1987 | Billet et al. | |
| 5,440,917 A | 8/1995 | Smith et al. | |
| 5,575,978 A * | 11/1996 | Clark .................. | B01F 11/0022 206/563 |
| 5,648,724 A | 7/1997 | Yankielun et al. | |
| 5,824,883 A | 10/1998 | Park et al. | |
| 6,038,914 A | 3/2000 | Carr et al. | |
| 6,222,373 B1 | 4/2001 | Morrison | |

(Continued)

FOREIGN PATENT DOCUMENTS

| | | |
|---|---|---|
| CN | 101505812 A | 8/2009 |
| CN | 201322679 Y | 10/2009 |

(Continued)

OTHER PUBLICATIONS

Translation CN-204165716-U (Year: 2015).*

(Continued)

*Primary Examiner* — Peter J Macchiarolo
*Assistant Examiner* — Monica S Young
(74) *Attorney, Agent, or Firm* — Abel Schillinger, LLP; Chi Suk Kim

(57) ABSTRACT

A leak detection system including a sensor having a first condition when dry and a second condition when wet; a communication device operatively coupled to the sensor; and an attachment element adapted to attach the leak detection system to an area for monitoring fluid leakage, wherein the attachment element is removable, reusable, or both.

18 Claims, 5 Drawing Sheets

(56) References Cited

U.S. PATENT DOCUMENTS

| | | |
|---|---|---|
| 6,445,304 B1 | 9/2002 | Bandeian, Jr. et al. |
| 6,571,607 B2 | 6/2003 | Jang et al. |
| 6,639,517 B1 | 10/2003 | Chapman et al. |
| 6,677,859 B1 | 1/2004 | Bensen |
| 6,812,846 B2 | 11/2004 | Gutta et al. |
| 6,877,359 B2 | 4/2005 | Huang et al. |
| 7,047,807 B2 | 5/2006 | Woodard et al. |
| 7,158,039 B2 | 1/2007 | Hayashida et al. |
| 7,239,246 B2 * | 7/2007 | Picco .............. G01M 3/04 324/691 |
| 7,398,676 B2 | 7/2008 | Lim et al. |
| 7,453,367 B2 | 11/2008 | Spaolonzi et al. |
| 7,456,744 B2 * | 11/2008 | Kuhns ............. G06K 19/0717 340/568.1 |
| 7,956,760 B2 * | 6/2011 | Hill .................. G01M 3/165 340/604 |
| 7,973,667 B2 | 7/2011 | Crnkovich et al. |
| 8,242,919 B2 * | 8/2012 | Oguri ............... G01N 27/121 204/403.14 |
| 8,264,347 B2 | 9/2012 | Castleman |
| 8,289,173 B2 | 10/2012 | Ben-Mansour et al. |
| 8,410,946 B2 | 4/2013 | Ansari et al. |
| 8,537,019 B2 | 9/2013 | Rolff et al. |
| 8,786,452 B1 | 7/2014 | Kreitz et al. |
| 9,245,438 B2 | 1/2016 | Burtner et al. |
| 9,651,448 B1 | 5/2017 | Miller |
| 2002/0189326 A1 | 12/2002 | Jang et al. |
| 2003/0101799 A1 * | 6/2003 | Huang .............. G01M 3/165 73/40 |
| 2005/0248356 A1 | 11/2005 | Care |
| 2007/0113890 A1 | 5/2007 | Woods et al. |
| 2009/0322543 A1 | 12/2009 | Crnkovich et al. |
| 2010/0045471 A1 | 2/2010 | Meyers |
| 2010/0100026 A1 | 4/2010 | Morris |
| 2013/0036802 A1 * | 2/2013 | Johnson ............. A61F 13/42 73/74 |
| 2013/0038457 A1 | 2/2013 | Stelea et al. |
| 2013/0327127 A1 | 12/2013 | Osthus et al. |
| 2014/0210603 A1 | 7/2014 | Walser |
| 2017/0003192 A1 | 1/2017 | Ling et al. |
| 2018/0067003 A1 * | 3/2018 | Michiwaki ......... G01L 5/0004 |
| 2019/0162625 A1 | 5/2019 | Carr et al. |
| 2019/0240078 A1 * | 8/2019 | Li .................... G01N 27/121 |

FOREIGN PATENT DOCUMENTS

| | | | |
|---|---|---|---|
| CN | 203132806 U | | 8/2013 |
| CN | 103969008 A | | 8/2014 |
| CN | 204165716 U | * | 2/2015 |
| CN | 204165716 U | | 2/2015 |
| EP | 0934513 B1 | | 12/2002 |
| GB | 2113835 A | | 12/1982 |
| JP | H02105140 U | | 8/1990 |
| JP | H05124628 A | | 5/1993 |
| JP | H05142086 A | | 6/1993 |
| JP | H09218124 A | | 8/1997 |
| JP | 2004101282 A | | 4/2004 |
| JP | 2004264269 A | | 9/2004 |
| JP | 2006078389 A | | 3/2006 |
| JP | 2009198487 A | | 9/2009 |
| JP | 2010286414 A | | 12/2010 |
| KR | 20060125151 A | | 12/2006 |
| KR | 20070005234 A | | 1/2007 |
| KR | 100784896 B1 | | 12/2007 |
| TW | M304659 U | | 1/2007 |
| TW | 200938823 A | | 9/2009 |
| TW | 201215867 A | | 4/2012 |
| TW | 201702566 A | | 1/2017 |
| WO | 2004038357 A1 | | 5/2004 |
| WO | WO-2004038357 A1 | * | 5/2004 |
| WO | 2013164558 A1 | | 11/2013 |
| WO | WO-2013164558 A1 | * | 11/2013 |
| WO | 2017004002 A1 | | 1/2017 |
| WO | 2019104276 A1 | | 5/2019 |

OTHER PUBLICATIONS

Translation WO2004038357 (Year: 2004).*
International Search Report issued in PCT/US2016/039748 dated Oct. 14, 2016, 1 page. ((15 pages w/ WO)).
International Search Report and Written Opinion for PCT/US2018/062464, dated Mar. 5, 2019, 14 pages.
Redacted Version of TSG search report, dated Sep. 17, 2014, 1 page.

* cited by examiner

LEAK DETECTION SYSTEM WITH ELECTRONICS COMPONENT

CROSS-REFERENCE TO RELATED APPLICATION(S)

This application is a divisional and claims priority under 35 U.S.C. § 120 to U.S. patent application Ser. No. 15/194,850 entitled, "LEAK DETECTION SYSTEM," by Gerald H. LING et al., filed Jun. 28, 2016, which application claims priority under 35 U.S.C. § 119(e) to U.S. Provisional Application No. 62/186,853 entitled, "LEAK DETECTION SYSTEM," by Gerald H. LING et al., filed Jun. 30, 2015, of which all are assigned to the current assignee hereof and incorporated herein by reference in their entireties.

FIELD OF THE DISCLOSURE

The present disclosure relates to a leak detection system.

RELATED ART

Many industrial and commercial applications involve the use of fluids which may be used, for example, in processing steps, fabrication functions such as masking or etching, or temperature control. Some fluids may be particularly harmful or require special attention in light of adverse environmental or biological affects. Other fluids may be exceptionally valuable, such as for example, pharmaceutical substances.

Many industries continue to demand a way to effectively and accurately monitor for leakage of harmful or valuable fluids.

BRIEF DESCRIPTION OF THE DRAWINGS

Embodiments are illustrated by way of example and are not intended to be limited in the accompanying figures.

DETAILED DESCRIPTION

Figure 1:
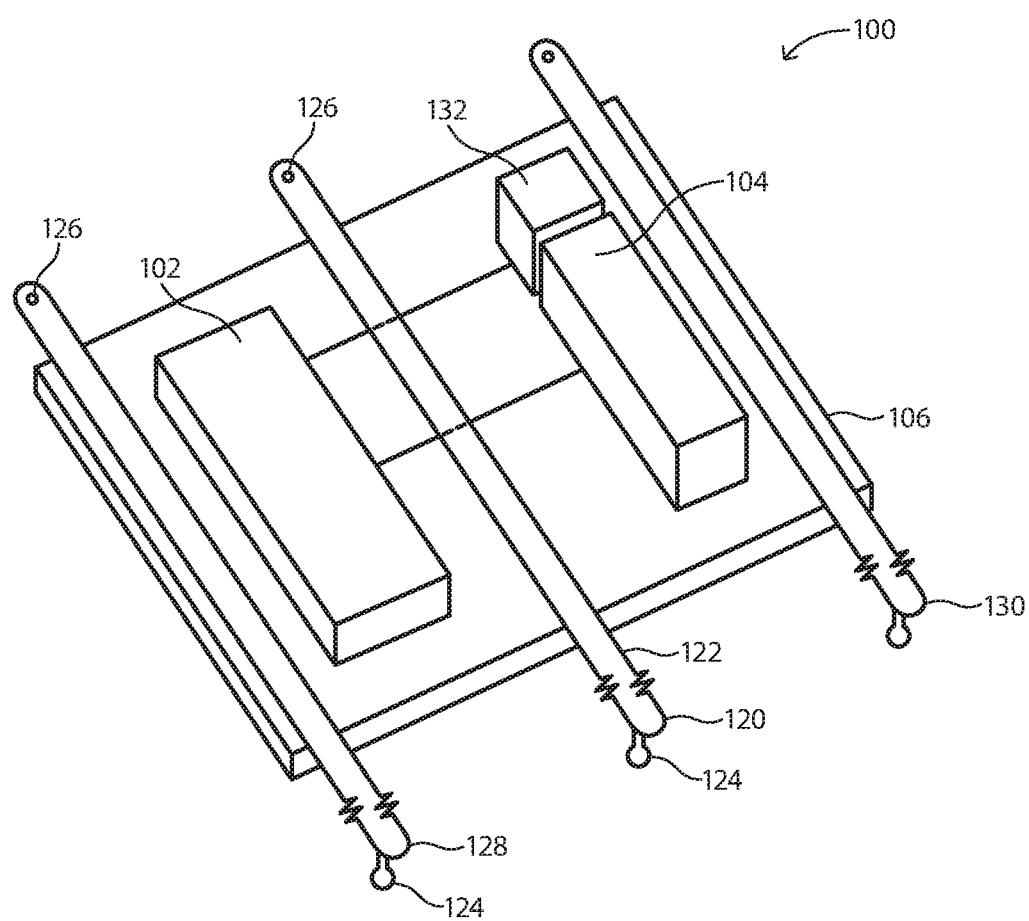
FIG. 1 includes a perspective view of a leak detection system in accordance with an embodiment.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the fluid transport arts.

A leak detection system in accordance with one or more of the embodiments described herein may generally include a sensor, a communication device coupled to the sensor, and an attachment element adapted to operatively couple the leak detection system to an area for monitoring fluid leakage. In an embodiment, the leak detection system may be disposed adjacent to a fluid interface on an equipment. The fluid interface may include, for example, a pipe junction, a seam or weld line, a nozzle or sprayer, a threaded port, a sampling valve, an exhaust line, a fluid inlet or outlet, or any other similar junction whereby fluid may leak from an equipment. In an embodiment, the sensor can have a first condition when dry and a second condition when wet. The communication device may transmit the condition (first or second) through a wireless protocol or wired connection to a receiving element adapted to communicate the condition of the area being monitored to a user or system which may respond to the leakage. In a particular embodiment, the attachment element may be removable, reusable, or both. That is, the attachment element may be selectively engaged with an equipment or area being monitored and selectively disengaged therefrom.

Leak detection systems as described herein may be positioned to monitor leakage on equipment spanning several different technical specialties. For example, a leak detection system in accordance with one or more embodiments described herein may be utilized in electronic device fabrication such as in the semiconductor and superconductor industry; medical devices such as fluid transport lines and pumps; pipe couplings such as those found in the oil and gas industry, potable water and sewer systems; aerospace industry in fabrication, maintenance, and design; food and beverage industry; and in the automotive industry. Leak detection systems described herein may reduce response time to leaks by quickly and accurately detecting small fluid leakages, allowing an operator to address a possible leak before it has an opportunity to grow larger.

In accordance with an embodiment, the sensor may be adapted to perceive a fluid leakage of as little as 0.0001 mL, at least 0.001 mL, at least 0.01 mL, at least 0.05 mL, or at least 0.1 mL. In another embodiment, the sensor may be adapted to perceive a fluid leakage upon contact with 0.0001 mL, 0.001 mL, 0.01 mL, 0.05 mL, or 0.1 mL.

Referring to FIG. 1, a leak detection system 100 may generally include a sensor 102 and a communication device 104. The sensor 102 and communication device 104 may be coupled to a common carrier, such as a substrate 106, which can maintain the sensor 102 and communication device 104 spatially coupled to one another. In another embodiment, described below, the sensor 102 and communication device 104 may be coupled to one another or to another object of the leak detection system, allowing for removal of substrate 106.

Figure 2:
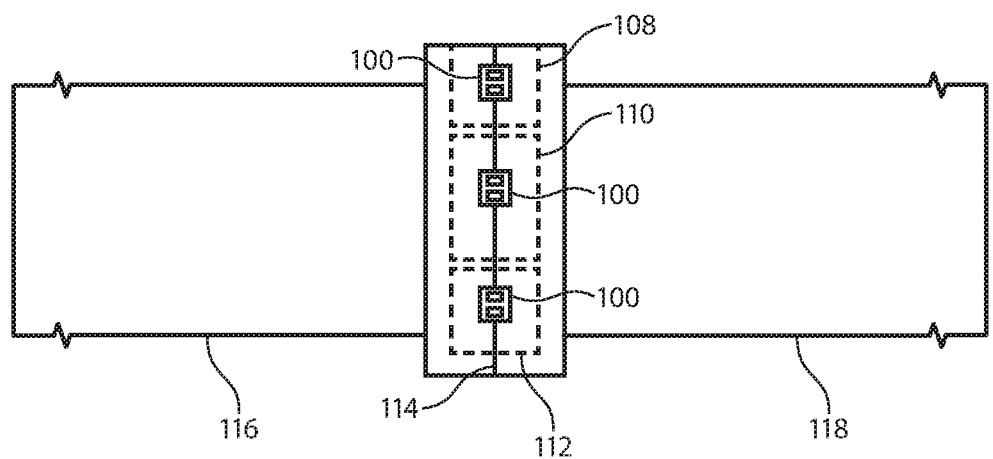
FIG. 2 includes a side elevation view of a plurality of leak detection systems disposed on a fluid interface between joining fluid conduits.

As illustrated in FIG. 2, at least one leak detection system 100 may be operatively coupled to a fluid interface 114, such as for example, between axial ends of a first fluid conduit 116 and a second fluid conduit 118, for monitoring fluid leakage therebetween. Each leak detection system 100 may monitor an area 108, 110, and 112 for fluid leakage. In an embodiment, the areas 108, 110, and 112 may each be at least 1 cm$^2$, at least 2 cm$^2$, at least 3 cm$^2$, at least 4 cm$^2$, at least 5 cm$^2$, at least 10 cm$^2$, at least 20 cm$^2$, at least 30 cm$^2$, at least 40 cm$^2$, at least 50 cm$^2$, at least 75 cm$^2$, or at least 100 cm$^2$. In an embodiment, the areas 108, 110, and 112 may be equal in size and have the same relative shape as one another. In another embodiment, the areas 108, 110, and 112 need not have the same shape or size. That is, in a non-illustrated embodiment, area 108 may be larger than area 110. Alternatively, area 112 may have a generally circular shape whereas area 108 may be generally rectangular. The shape and size of the area 108, 110, and 112 may depend on several factors, such as for example, the size or sensitivity of the sensor 102, the relative location of the sensor 102, or even the type of fluid being monitored. For example, a sensor 102 disposed at a lower position of a fluid conduit may monitor a larger area as fluid might pool or collect at the bottom of the fluid conduit, whereas a sensor 102 disposed at an upper position of the fluid conduit might monitor only a small area as fluid may be less likely to collect at the upper position. In a particular embodiment, a single leak detection system 100 may be positioned at a vertically lowest location along the fluid conduit.

In a particular instance, the areas 108, 110, and 112 may be adjacent to one another, such as immediately adjacent to one another or slightly spaced apart from one another. That is, the areas 108, 110, and 112 may not overlap each other. In another instance, at least two of the areas 108, 110, and 112 may at least partially overlap. That is, the at least two areas 108, 110, and 112 may share a common area. For example, by way of a non-limiting embodiment, areas 108 and 110 may each be 10 cm$^2$ with at least 2 cm$^2$ overlap therebetween. Thus, the effective monitored area (as covered by areas 108 and 110) is 18 cm$^2$. In a particular embodiment, at least two of the leak detection systems 100 can overlap by at least 1%, at least 2%, at least 3%, at least 4%, at least 5%, at least 10%, or at least 25%. In another particular embodiment, the at least two leak detection systems 100 can overlap by no greater than 99%, no greater than 98%, no greater than 97%, no greater than 96%, no greater than 95%, no greater than 90%, or no greater than 75%. Overlapping at least two of the areas 108, 110, and 112 may reduce the rate of failure to detect a leakage that might otherwise occur if one of the leak detection systems 100 were to fail.

Figure 3:
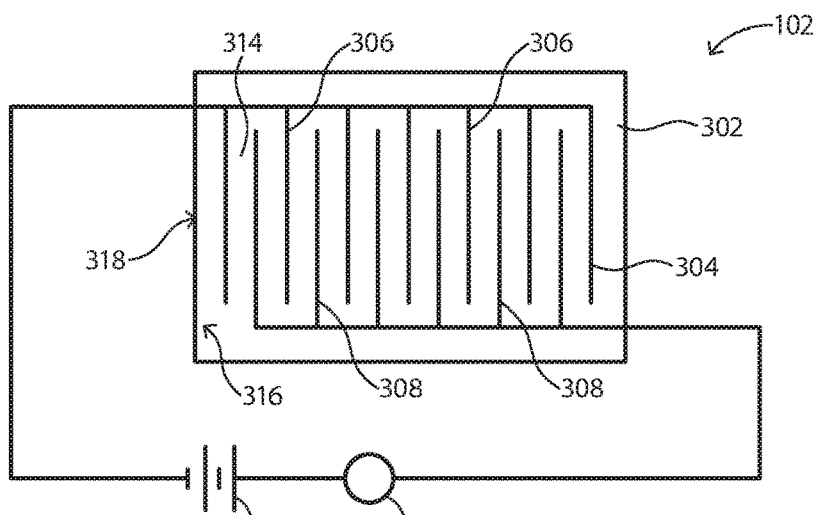
FIG. 3 includes a schematic view of a sensor in accordance with an embodiment.

Referring to FIG. 3, in an embodiment, the sensor 102 may include a substrate 302 and a detection element 304. The detection element 304 may be attached to the substrate 302, such as for example, by an adhesive, a threaded or non-threaded fastener, a mechanical fastener, or another suitable method.

In an embodiment, the detection element 304 may include an electrical circuit. More particularly, the detection element 304 may include a broken circuit in the dry condition and a closed circuit in the wet condition (i.e., upon fluid contact). In a particular embodiment, the electrical circuit can include a plurality of first fingers 306 and a plurality of second fingers 308, where the first and second plurality of fingers 306 and 308 are spaced apart by a gap 314 having a distance, D, so as to be electrically disconnected from one another. The distance, D, may be uniform between a length of the fingers 306 and 308 or nonuniform (e.g., wavering or changing). Fluid interaction with the substrate 302 may bridge the gap 314, creating a closed circuit through which current may flow. A power source 132 (discussed in greater detail below) electrically biasing the detection element 304 may permit current flow when the circuit is closed. Upon such occurrence, the detection element 304 may switch from a first condition (indicating the sensor 102 is dry) to a second condition (indicating the sensor 102 is wet), causing the communication device (FIG. 1) to transmit a signal relaying occurrence of a fluid leakage. Such action may occur, for example, by a change in voltage, current, or resistance as measured by an appropriate element 312 electrically coupled to the detection element 304.

In a non-illustrated embodiment, the detection element 304 may include a wire having one or more disconnected segments along a length thereof. Upon contacting a fluid, the disconnected segments may be bridged, creating a closed circuit through which current may flow. In an embodiment, at least one of the disconnected segments may have a length, as measured by a shortest distance between two segments of the wire which, if bridged, would complete the circuit, of at least 0.001 inches, at least 0.01 inches, at least 0.1 inches, or even at least 1 inch. In another embodiment, the length of the disconnected segments may be no greater than 10 inches, no greater than 5 inches, or even no greater than 2 inches.

Shorter disconnected segment lengths may decrease the time required to close the circuit, accelerating the rate of leak detection.

In an embodiment, leak detection elements 304 are particularly suitable for applications where the fluid being monitored is conductive. That is, closing the circuit is performed by bridging the gap 314, which in turn requires a conductive medium. Exemplary conductive fluids include distilled water, salt water, alcohol, acid, and liquid metal. Those of ordinary skill in the art will recognize that this list is exemplary and not intended to be exhaustive.

In a particular embodiment, the substrate 302 may include a material adapted to rapidly transfer fluid from the surface being monitored to the detection element 304. For example, the substrate 302 may include a wicking material or other suitable material having a high fluid transfer rate. Exemplary materials include closed or open-cell foam, woven or nonwoven mesh, textiles, and polymers. It is believed that the use of materials having high fluid transfer rates may accelerate transfer of fluid from the fluid interface to the detection element 304, reducing sensing time and, in turn, accelerating leak detection.

In an embodiment, the substrate 302 may have a thickness, as measured in the installed state, of no greater than 10 inches, no greater than 5 inches, no greater than 1 inch, no greater than 0.75 inches, no greater than 0.5 inches, no greater than 0.1 inches, or even no greater than 0.01 inches. In another embodiment, the substrate 302 may have a thickness, as measured in the installed state, of at least 0.001 inches. In a particular instance, the substrate 302 may deform during installation. That is, the substrate 302 may elastically or plastically deform from its uninstalled shape. Such deformation may permit the substrate 302 to better fit with contours and undulations of the surface onto which the leak detection system 100 is being installed. Deformation may occur through flexure, compression, or expansion of the substrate as caused, for example, by forces necessary to secure the leak detection system 100 to the surface.

In an embodiment, prior to installation, in a relaxed state, the substrate 302 may be generally planar. That is, the substrate 302 may deviate from a plane by no greater than 2 inches, 1.5 inches, 1 inch, 0.5 inches, or 0.25 inches at any location therealong. In another embodiment, the substrate 302 can be sufficiently flexible such that when positioned on a planar surface the substrate 302 assumes a generally planar shape.

In another embodiment, prior to installation, in a relaxed state, the substrate 302 may have a generally arcuate cross section. For example, the substrate 302 may have a radius of curvature, R, of at least 1 inch, at least 2 inches, at least 3 inches, at least 4 inches, at least 5 inches, at least 6 inches, at least 12 inches, at least 24 inches, or even at least 48 inches. In an embodiment, R can be no less than 0.001 inches. Such arcuate-shaped substrates 302 may be suitable for engagement, for example, with fluid conduits (e.g., pipes and tubing) having circular cross-sections. The radius of curvature of the substrate 302 may be selected to best fit the shape and size of the fluid conduit or surface being monitored. In a particular embodiment, the substrate 302 can have an arcuate cross section in the relaxed state and may flex upon occurrence of a sufficient loading condition. This may permit low-strain usage of the substrate 302 with fluid conduits while simultaneously permitting flexure to accommodate deviations in the surface profile and texture of the fluid conduit.

In a particular instance, the substrate 302 may have an initial thickness, $T_I$, different from an installed thickness, $T_E$. $T_I$ may be greater than $T_E$. For example, $T_I$ may be at least 1.01 $T_E$, at least 1.05 $T_E$, at least 1.1 $T_E$, at least 1.2 $T_E$, at least 1.3 $T_E$, at least 1.4 $T_E$, at least 1.5 $T_E$, at least 2.0 $T_E$, or at least 5.0 $T_E$. In an embodiment, $T_I$ may be no greater than 100 $T_E$, no greater than 50 $T_E$, or no greater than 25 $T_E$. $T_I$ and $T_E$ may be measures of absolute thickness (thickness at a particular location) or average thickness of the substrate 302 as measured over select areas of the substrate 302 or the entire area of the substrate 302.

The substrate 302 may define opposing major surfaces—i.e., a first major surface 316 and a second major surface 318, spaced apart by the thickness of the substrate 302. The detection element 304 may be disposed along one of the first and second major surfaces 316 and 318. As illustrated, in an embodiment, the detection element 304 may be disposed centrally along the major surface 316 or 318. Such central position may maximize the volume and speed of fluid interaction with the detection element 304 by displacing the detection element 304 equally from all edges of the substrate 302. This may decrease detection regardless of the edge of the substrate 302 fluid first contacts. Alternatively, by way of a non-illustrated embodiment, the detection element 304 may be disposed at a peripheral portion of the substrate 302, i.e., closer to one of the edges. Such position may be suitable for leak detection systems 100 having particular applications with a nonsymmetrical interface.

In a particular embodiment, the detection element 304 can occupy less than 90% of a surface area of the substrate 302, less than 80% of the surface area of the substrate 302, less than 70% of the surface area of the substrate 302, less than 60% of the surface area of the substrate 302, less than 50% of the surface area of the substrate, less than 40% of the surface area of the substrate, less than 30% of the surface area of the substrate, less than 20% of the surface area of the substrate, less than 10% of the surface area of the substrate, or less than 1% of the surface area of the substrate. In another particular embodiment, the detection element 304 can occupy at least 0.001% of the surface area of the substrate 302.

Figure 4:
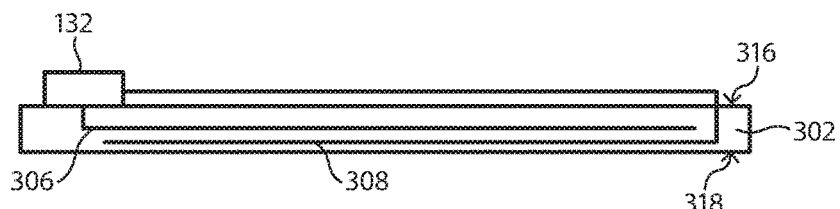
FIG. 4 includes a cross-sectional elevation view of the sensor in accordance with an embodiment.

Referring to FIG. 4, in accordance with a particular embodiment, the detection element 304 may be at least partially embedded within the substrate 302. That is, at least a portion of the detection element 304 may be disposed between the major surfaces 316 and 318 of the substrate 302. In a more particular embodiment, at least a portion of at least one of the first or second plurality of fingers 306 or 308 may be embedded within the substrate 302. In another embodiment, all of at least one of the first or second plurality of fingers 306 or 308 may be embedded within the substrate 302. In yet a further embodiment, all of the first and second plurality of fingers 306 and 308 may be embedded within the substrate 302. Disposition of at least a portion of the detection element 304 between the major surfaces 316 and 318 may accelerate leak detection by reducing a distance, as measured in a direction normal to the major surfaces 316 and 318, fluid is required to travel to bridge the gap 314 (FIG. 3) and close the circuit.

As illustrated, in an embodiment, at least one of the first plurality of fingers 306 may be vertically offset (in a direction normal to the major surfaces 316 and 318) from at least one of the second plurality of fingers 308. Such positioning may accelerate detection timing by further reducing a distance between the detection element 304 and the surface being monitored. In another embodiment, the first and second plurality of fingers 306 and 308 may be disposed at a same relative position with respect to the major surfaces 316 and 318.

Figure 5:
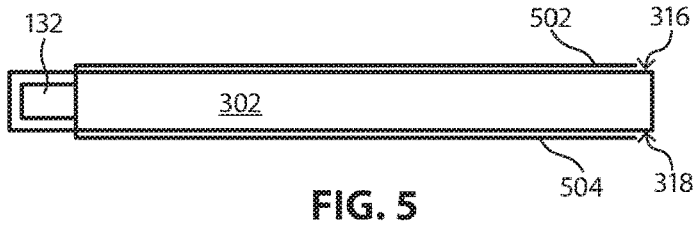
FIG. 5 includes a cross-sectional elevation view of the sensor in accordance with another embodiment.

In yet a further embodiment, such as illustrated in FIG. 5, the detection element 304 may be disposed at least partially on both major surfaces 316 and 318. For example, a first detection element 502 may be disposed on the first major surface 316 and a second detection element 504 may be disposed on the second major surface 318. Disposition of the first detection system 502 on the first major surface 316 and the second detection element 504 on the second major surface 318 may permit reversible installation of the detection element 304 on a surface for fluid monitoring. In an embodiment, the leak detection elements 502 and 504 may share a single power source 132. In a non-illustrated embodiment, the leak detection elements 502 and 504 and may each utilize separate power sources.

Figure 6:
FIG. 6 includes a cross-sectional elevation view of the sensor in accordance with another embodiment.

Referring to FIG. 6, in an embodiment, a single leak detection element 600 can be disposed on the substrate 302 such that at least one of the first plurality of fingers 306 is adjacent to the first major surface 316 and at least one of the second plurality of fingers 308 is adjacent to the second major surface 318. As illustrated, the first and second plurality of fingers 306 and 308 may be disposed on the first and second major surfaces 316 and 318, respectively. In another particular embodiment, at least one of the first and second plurality of fingers 306 and 308 may be at least partially embedded within the substrate 302 adjacent to the first and second major surfaces 316 and 318, respectively.

Referring again to FIG. 4, in an embodiment, the power source 132 may be disposed adjacent to one of the major surfaces 316 or 318. In a particular embodiment, the power source 132 may be disposed on the major surface 316 or 318. That is, the power source 132 may rest on the major surface 316 or 318. In operation, the opposite major surface 316 or 318 (i.e., the major surface opposite the power source) may be disposed on the surface being monitored to permit flush contact therewith.

In another particular embodiment, the power source 132 may be partially embedded within the substrate 302 so as to extend into the substrate while being partially visible. In yet a further embodiment, such as illustrated in FIGS. 5 and 6, the power source 132 may be fully embedded within the substrate 302. Electrical contacts (not illustrated) may extend from the substrate, allowing for coupling of the detection element and communication device (not illustrated).

Figure 7:
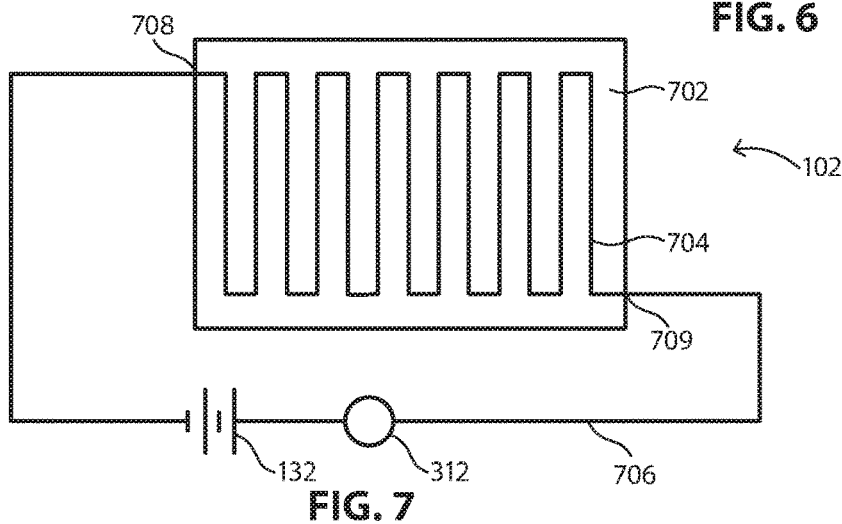
FIG. 7 includes a schematic view of a sensor in accordance with another embodiment.

Referring now to FIG. 7, in an embodiment, the sensor 102 may include a detection element 704 defining a closed circuit in the dry condition and a broken circuit in the wet condition (i.e., upon fluid contact). The detection element 704 may be coupled to a substrate 702. In an embodiment, the substrate 702 can have any or all of the characteristics as described above with respect to substrate 302. For example, the substrate 702 may have an initial thickness, $T_I$, different from an installed thickness, $T_E$. In another embodiment, the substrate 702 may be different from the substrate 302. For example, as described below, application of the detection element 704 may be best suited for use with corrosive or deleterious fluids which may break or disrupt a continuous wire 706 upon exposure. Thus, it may be desirable to utilize a substrate adapted to withstand exposure to the damaging effects of the corrosive or deleterious fluid. As used herein, "wire" refers to a conductive member having a length and a thickness, where the length is greater than the thickness. Exemplary wires include cylindrical wires, wound wires, single-thread wires, ribbons, bands, sheets, cords, and other similar elements.

In an embodiment, it may be desirable for the substrate 702 to break down or become damaged upon contact with the corrosive or deleterious fluid. Specifically, the substrate 702 may break down upon contact with the fluid, causing more rapid advancement of the fluid through the substrate to the detection element.

In a particular instance, the wire 706 may have a total length, $L_W$, as measured by a length of the wire 706 on the substrate 702, that is greater than an effective length, $L_E$, of the wire 706, as measured by a direct distance between the location the wire 706 enters 708 and exits 709 the substrate 702. In an embodiment, the wire 706 may pass over the substrate 702 in a non-straight line. As illustrated, the wire 706 may form a plurality of straight segments interconnected at 90 degree angles. The disclosure is not intended to be limited to those embodiments having 90 degree angles, but instead further includes interconnection of line segments at both acute and obtuse angles. In another embodiment, the wire 706 may have a generally serpentine shape. The wire 706 may have other shapes, which may include concentric circles, concentric ovals, zigzags, spirals, and other arcuate or straight segmented shapes having total lengths, $L_W$, greater than the effective length, $L_E$, on the substrate 702. It is believed that wires 706 with total lengths, $L_W$, greater than the effective length, $L_E$, may increase fluid sensitivity or even reduce sensing time.

Figure 8:
FIG. 8 includes a cross-sectional elevation view of the sensor of claim 7 in accordance with an embodiment.

In an embodiment, the detection element 704 may include portions at least partially embedded within the substrate 702. FIG. 8 illustrates a cross-sectional view of the detection element 704 in accordance with an embodiment. As illustrated, the wire 706 extends through the substrate 702 in a non-straight line. That is, the wire 706 extends through the substrate in a plurality of straight segments interconnected at 90 degree angles. The disclosure is not intended to be limited to those embodiments having 90 degree angles, but instead further includes interconnection of line segments at both acute and obtuse angles. Disposition of the wire 706 at various vertical elevations within the substrate 702 may permit reversible installation of the detection element 704 with respect to the surface being monitored. Additionally, the wire 706 occupies a greater relative volume of the substrate 702, which accelerates the rate at which a fluid contacting the substrate 702 will contact the wire 706.

In a non-illustrated embodiment, the detection element may include a conductive structure having a two- or three-dimensional matrix, or quasi-matrix shape instead of, or in addition to, the wire 706. In a particular instance, the conductive structure may have a low flexure modulus, permitting flexure of the detection element. A material may be positioned around the conductive structure, for example by overmolding or extruding, to protect the conductive structure or to facilitate easier attachment of the conductive structure to a surface for monitoring.

Figures 9, 10:
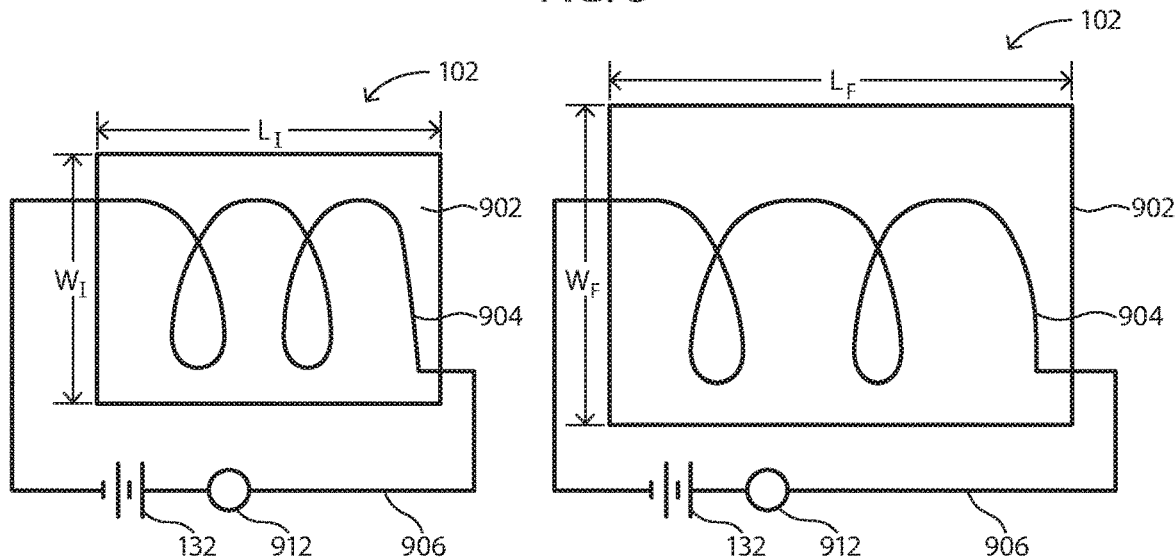
FIG. 9 includes a schematic view of another sensor in a dry state in accordance with an embodiment.
FIG. 10 includes a schematic view of the sensor of FIG. 9 in a wet state in accordance with an embodiment.

Referring now to FIGS. 9 and 10, in accordance with an embodiment, the sensor 102 may include a detection element 904 coupled to a substrate 902 adapted to have one or more changing characteristics in response to fluid contact.

In a particular embodiment, the changing characteristic of the substrate 902 may be the size of the substrate 902. For example, FIG. 9 illustrates a sensor 102 as seen prior to fluid contact. The substrate 902 has an initial length, $L_I$, and an initial width, $W_I$. After contacting fluid, the substrate 902 can change in size, having a final length, $L_F$, and a final width, $W_F$, as illustrated in FIG. 10. In an embodiment, $L_I$ can be less than $L_F$ and $W_I$ can be less than $W_F$. In another embodiment, $L_I$ can be greater than $L_F$ and $W_I$ can be greater than $W_F$. A wire 906 extending across a portion of the substrate 902 can permit detection of a change in size of the substrate 902. More particularly, an element 912 can measure conductivity, or another suitable characteristic, of the wire 906 as it changes with strain imposed by the substrate 902. When conductivity, or other suitable characteristic, changes, the detection system 902 may change from a first condition (dry) to a second condition (wet), thus permitting notification of a fluid leakage. Although the wire 906 is illustrated as having a looping shape including a plurality of loops, the wire 906 may also have any shape as described above with respect to wire 706.

In an embodiment, the substrate 902 may be formed from a material adapted to expand upon contact with fluid. For example, the substrate 902 may include, or consist essentially of, a fibrous material, a woven or non-woven material, a matrix or quasi-matrix based material, or any other suitable material adapted to expand upon contact with fluid.

The wire 906 may extend at least partially into the substrate 902. In an embodiment, a majority of the wire 906 may be embedded in the substrate 902. In a further embodiment, all of the wire 906 may be embedded in the substrate 902. Partial or full embedment of the wire 906 may improve speed of fluid leakage detection as forces acting on the substrate 902 may be more readily transmitted to an embedded wire 606 as opposed to a wire disposed on a major surface of the substrate 902.

Detection element 904 and substrate 902 may include any or all of the features discussed above with respect to detection elements 304 and 704, and substrate 302 and 702, respectively.

Figures 11, 12:
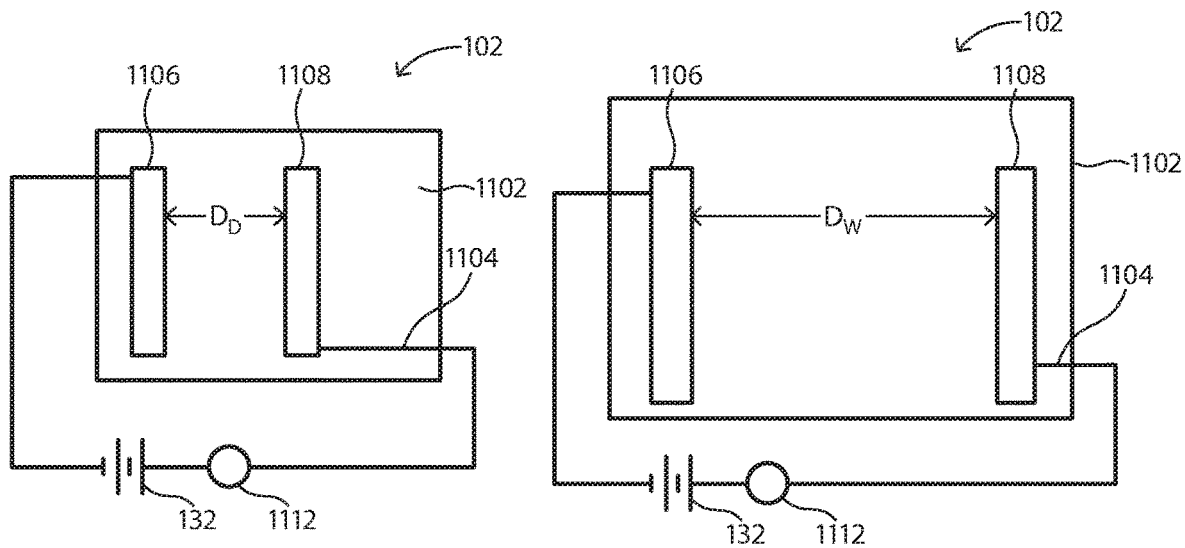
FIG. 11 includes a schematic view of another sensor in a dry state in accordance with an embodiment.
FIG. 12 includes a schematic view of the sensor of FIG. 11 in a wet state in accordance with an embodiment.

In another embodiment, illustrated for example in FIGS. 11 and 12, the sensor 102 may include a detection element 1104 having a first element 1106 disposed at a first location of a substrate 1102 and a second element 1108 disposed at a second location of the substrate 1102. The first and second elements 1106 and 1108 may be separated by a distance, $D_D$, as measured in the dry state, and a distance, $D_W$, as measured in the wet state. $D_D$ can be different from $D_W$. In a particular instance, $D_W$ is greater than $D_D$. That is, the first element 1106 is spaced apart from the second element 1108 by a greater distance when the sensor 102 is wet as compared to when the sensor 102 is dry. In another instance, $D_W$ is less than $D_D$. That is, the first element 1106 is spaced apart from the second element 1108 by a shorter distance when the sensor 102 is wet as compared to when the sensor 102 is dry.

As the distance between the first and second elements 1106 and 1108 changes, electromagnetic forces therebetween change. In an embodiment, the electromagnetic interaction between the first and second elements 1106 and 1108 can decrease as the distance between the first and second elements increases. That is, as $D_W$ increases with respect to $D_D$, the electromagnetic interaction between the first and second elements 1106 and 1108 decreases. Such decreased interaction is detectible by an element 1112 which subsequently detects a wet condition.

In an embodiment, the first element 1106 may be a conductive bar. In another embodiment, the second element 1108 may be a conductive bar. In a further embodiment, the first and second elements 1106 and 1108 have a generally same shape as compared to one another. In another embodiment, the first and second elements 1106 and 1108 have generally different shapes as compared to one another. In a particular aspect, at least one of the first and second elements 1106 and 1108 may be flexible. This may facilitate improved flexure within the substrate, for example, during installation of the sensor 102 or during expansion or contraction of the substrate 1102 during fluid contact. In another aspect, at least one of the first and second elements 1106 and 1108 may be rigid. This may prevent the first and second elements 1106 and 1108 from undesirably shifting or bending during installation or handling. Such shifting and bending may result in unexpected electromagnetic interaction between the first and second elements 1106 and 1108. In a particular embodiment, the baseline measurement for electromagnetic interaction between the first and second elements 1106 and 1108 may be conducted after installation such that the baseline (dry) electromagnetic interaction is not affected by deformation of the first or second elements 1106 or 1108 during handling or installation.

In a particular instance, both the first and second elements 1106 and 1108 are disposed along a major surface 316 or 318 of the substrate 1102. In a more particular instance, both the first and second elements 1106 and 1108 are disposed along a same major surface 316 or 318. In another instance, at least one of the first and second elements 1106 or 1108 is at least partially embedded within the substrate 1102. In yet a further instance, at least one of the first and second elements 1106 or 1108 is fully embedded within the substrate 1102. In another instance, the first and second elements 1106 and 1108 may be equally disposed relative to the substrate 1102. That is, the first and second elements 1106 and 1108 may both be fully embedded within the substrate 1102; the first and second elements 1106 and 1108 may both be partially embedded within the substrate 1102; or the first and second elements 1106 and 1108 may be disposed along the same major surface 316 and 318 of the substrate 1102.

It is contemplated in other embodiments, that the sensor can include a substrate adapted to produce luminescence, fluorescence, incandescence, a change in temperature, a change in pressure as a result of contacting fluid, or any other suitable changing characteristic in response to contacting fluid. The detection element can be selected accordingly to detect the changing condition of the substrate. For example, the detection element may include an optical sensor, a thermocouple, or a pressure transducer. As the substrate changes in condition (luminescence, fluorescence, incandescence, temperature, or pressure) as a result of contacting fluid, the detection element can sense the changed condition and generate a signal to the communication device 104 in order to generate an alert of a leakage.

Figure 13:
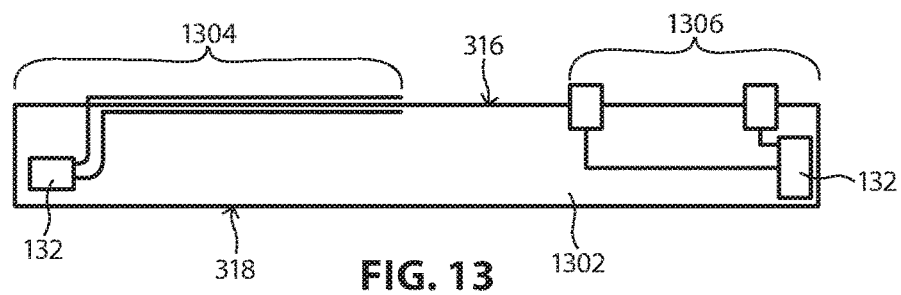
FIG. 13 includes a cross-sectional elevation view of a sensor having two detection elements in accordance with an embodiment.

Referring to FIG. 13, and in accordance with an embodiment, a sensor 102 may include at least two detection elements 1304 and 1306 disposed on one or more substrates 1302. In a particular embodiment, the detection elements 1304 and 1306 may be disposed on a same substrate 1302. In another particular embodiment, the detection elements 1304 and 1306 may be disposed on adjoining substrates (collectively referred to as "the substrate"). The detection elements 1304 and 1306 may be disposed on the same or different major surfaces 316 or 318 of the substrate 1302. As illustrated, and in accordance with another embodiment, the detection elements 1304 and 1306 may also be at least partially embedded within the substrate 1302.

In an embodiment, the detection elements 1304 and 1306 can be different from one another. That is, each of the at least two detection elements 1304 and 1306 may be adapted to detect a different condition of the substrate 1302. For example, as illustrated, the detection element 1304 may be similar to detection element 304 described above, whereas detection element 1306 may be similar to detection element 1104. In a particular embodiment, the detection elements 1304 and 1306 can be spaced apart on the substrate 1302. This may facilitate easier assembly of the sensor 102 and permit easier removal of broken or unsuitable detection elements. In another embodiment, the detection elements 1304 and 1306 can overlap vertically or horizontally. Vertical or horizontal overlap may reduce the size of the sensor, thus reducing the space necessary to install the sensor.

Although not illustrated, any of the detection elements described above may further include an electronic component, such as: a resistor, a capacitor, an inductor, a transistor, another similar component, or any combination thereof. Such electronic components may be necessary to develop complete circuits for the detection elements described above.

Referring again to FIG. 1, the communication device 104 may be operatively coupled to the sensor 102. In a particular embodiment, the communication device 104 may be wirelessly connected to the sensor 102. This wireless communication may occur, for example, by Bluetooth or by another short range wireless protocol. In another particular embodiment, the communication device 104 is connected to the sensor 102 by a conductive wire. Care should be taken to ensure the conductive wire is not sensitive to the fluid being monitored. That is, the conductive wire should not be constructed from a material that will be destroyed upon fluid contact. Alternatively, the conductive wire may be insulated or otherwise protected against damaging fluid interaction by an outer layer or shield layer disposed between the wire and the suspected channel for fluid travel in the leak detection system 100. In a further embodiment, the communication device 104 may be integral to the sensor 102.

In an embodiment, the communication device 104 may be coupled to the substrate 106. In another embodiment, the communication device may be coupled to the sensor 102.

The communication device 104 may be a wireless or wired communication device. That is, the communication device 104 may operate using a wireless protocol, such as an HTML or HTMLS; a local area network (LAN); or a wired protocol such as a conductive wire. The communication device 104 may be adapted to receive an incoming signal from the sensor 102 and send an outgoing signal to a receiving device when the sensor 102 senses a fluid leakage.

In an embodiment, the communication device 104 may continuously operate. As used herein, "continuously operate" refers to continuous, or uninterrupted, transmission of a signal from the communication device to, for example, a receiving device. In an embodiment, the communication device 104 can passively operate. As used herein, "passively operate" refers to transmission of a signal, for example, to a receiving device, only upon occurrence of a threshold condition—i.e., a fluid leak. For example, the communication device 104 may be powered by the power source 132. Only when the sensor 102 senses a leakage might the communication device 104 receive power so as to transmit the signal to the receiving device. This may increase operable lifetime of the leak detection system 100 by reducing current draw from the power source 132, thus allowing for more remote positioning of the leak detection system 100.

As illustrated, in an embodiment the communication device 104 may be exposed such that it extends beyond an outer surface of the substrate 106. Thus, the communication device 104 may be accessible such that a user can adjust or replace the communication device 104. In a non-illustrated embodiment, the communication device 104 may be at least partially, such as fully, embedded within the substrate 106. This may protect the communication device 104 from exposure to harmful fluids which may otherwise contact the communication device 104 if disposed on the surface of the substrate 106.

In an embodiment, the communication device 104 may be removable from the substrate 106. In another embodiment, the communication device 104 may be replaceable. An electrical interface (not illustrated) may permit rapid replacement of the communication device 104. For example, the electrical interface may consist of one or more ports having electrical connection points which match electrical connection points on the communication device 104. The various communication devices 104 may have the same arrangement of electrical connection points, thereby enabling rapid replacement and interchanging therebetween.

Referring still to FIG. 1, the leak detection system 100 may further include an attachment element 120 adapted to attach the leak detection system 100 to a surface adjacent to the fluid interface 114 (FIG. 2).

In an embodiment, the attachment element 120 may include a unitary body. That is, the attachment element 120 can be formed from a single piece. In another embodiment, the attachment element 120 may include a multi-piece construction. For example, the attachment element 120 may include at least two components engageable together, or to the substrate 106 or one or more components disposed thereon, to form a single piece.

In an embodiment, the attachment element 120 may be directly coupled to the substrate 106. In a non-illustrated embodiment, the attachment element 120 may be indirectly coupled to the substrate 106 through the sensor 102, the communication device 104, or some other suitable intermediary objection.

The attachment element 120 may releasably couple to the leak detection system 100 to a surface for monitoring fluid leakage. That is, in an embodiment, the attachment element 120 may be removable from the leak detection system 100. This may permit replacement or adjustment of the attachment element 120 with respect to the leak detection system 100. Over extended periods of usage (particularly at high temperatures or in damp conditions) it is possible for the attachment element 120 to degrade or wear—a problem which can be greatly mitigated by periodically replacing the attachment element 120. In another embodiment, the attachment element 120 may be integral with the leak detection system 100. For example, the attachment element 120 may be molded or otherwise fabricated into the substrate 106, sensor 102, or communication device 104 so as to be inseparable therefrom, thus preventing accidental separation during installation or over extended usage.

Figure 14:
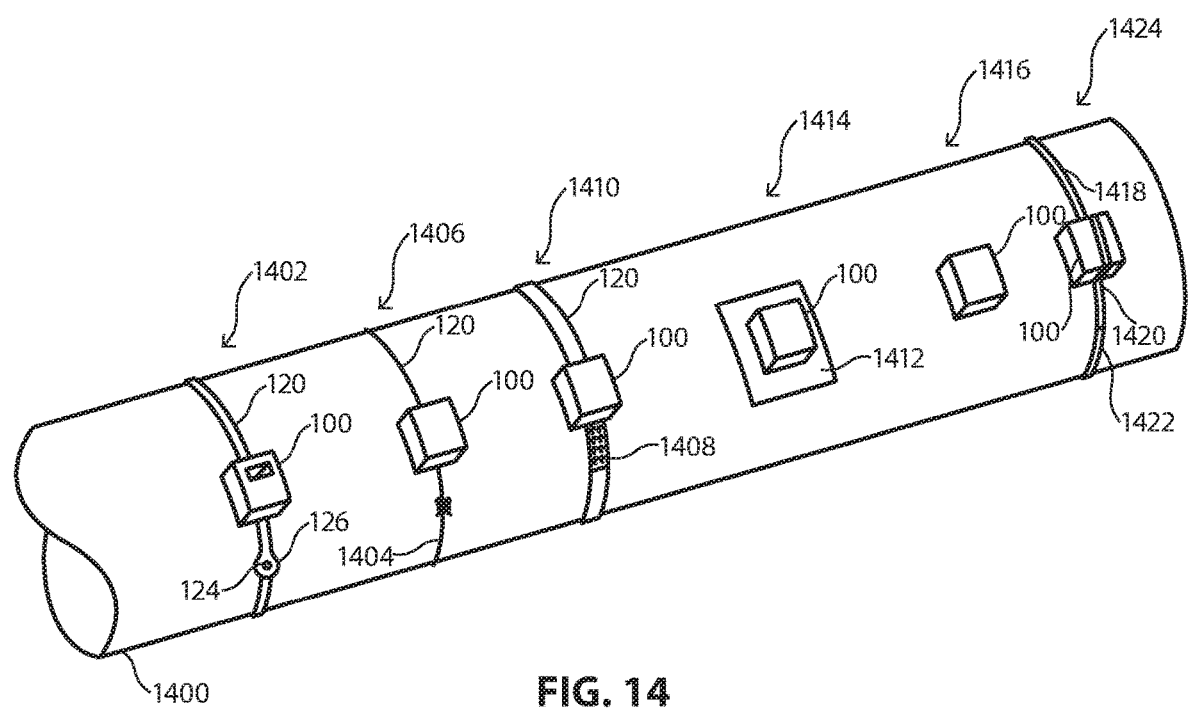
FIG. 14 includes a perspective view of a fluid conduit having a plurality of sensors coupled thereto, each sensor having a different attachment element in accordance with an embodiment.

As illustrated in FIG. 1, in an embodiment the attachment element 120 may include a band 122, an engagement element 124 extending from the band 122, and an opening 126 adapted to receive the engagement element 124. To install the leak detection system 100 on a fluid conduit, the band 122 may be positioned around the fluid conduit until the engagement element 124 can engage with the opening 126. The engagement element 124 can then be inserted into the opening 126 to hold the leak detection system 100 relative to the fluid conduit. For applications requiring more secure attachment protocol, one or more additional attachment elements (e.g., attachment elements 128 and 130) may be deployed along the substrate 106 or in another suitable manner, such as described above. The attachment elements 122, 128, and 130 may each include a same or similar attachment protocol as one another. For example, the attachment element 128 may include engagement element 124 and opening 126 into which the engagement element 124 is insertable. In an embodiment, the attachment elements 122, 128, and 130 may be spaced apart along the surface of the leak detection system 100 to enhance engagement with the surface and to spread loading conditions across the substrate 106. An installed leak detection system 1402 having a band 122, engagement element 124, and opening 126 installed around a fluid conduit 1400 is illustrated in FIG. 14.

In an embodiment, the band 122 may be flexible or otherwise elastically deformable. The band 122 may be adapted to stretch around the fluid conduit, providing an inwardly oriented retention force that acts to pull the substrate 106 into the fluid conduit. Exemplary materials include woven fabrics, nonwoven fabrics, and polymers. Suitable polymers may include, for example, elastomers, such as rubber. In an embodiment, the attachment element 120 may have an unloaded size, $S_U$, as measured at rest, and a loaded size, $S_L$, as measured under loading conditions, where $S_L$ may be at least 1.01 $S_U$, at least 1.1 $S_U$, at least 1.5 $S_U$, at least 2.0 $S_U$, at least 5.0 $S_U$, at least 10.0 $S_U$, or at least 20.0 $S_U$. In another embodiment, $S_L$ may be no greater than 200 $S_U$. The unloaded and loaded sizes may be a length of the attachment element 120—i.e., a length of the band 122—in the unloaded and loaded states, respectively.

In another embodiment, the attachment element 120 may include an elongated object 1404, such as a rope, a cord, a string, or other similar device. The elongated object 1404 may be tied around the surface of the fluid conduit 1400 to secure the leak detection system 100 thereto. An installed leak detection system 1406 having an elongated object 1404 as an attachment element 120 is illustrated in FIG. 14. As illustrated, the ends of the elongated object 1404 are tied together in a knot. In a non-illustrated embodiment, the leak detection system 100 may be secured to the fluid conduit 1400 by a plurality of elongated objects 1404. The longitudinal ends of the elongated objects 1404 may be tied together at a same relative circumferential position along the fluid conduit. Alternatively, the longitudinal ends may be staggered around the circumference of the fluid conduit. In a non-illustrated embodiment, the elongated object 1404 may have an engagement mechanism at longitudinal ends thereof. For example, the elongated object 1404 may terminate in a buckle, a ratchet, an eyelet, a ratcheting tie system, a cable tie, a threaded or non-threaded fastener, or any other suitable engagement element permitting connection of opposing longitudinal ends of the elongated object 1404.

In yet a further embodiment, the attachment element 120 may include a hook and loop engagement system. Similar to the leak detection system 100 described above with an elongated object 1404, it is contemplated that the attachment element 120 may include a band of material 1408 having a hook and loop engagement. The band 1408 may be elastic or non-elastic and may be wrapped around the fluid conduit 1400 such that a first portion of the band 1408 having hooks is coupled to a second portion of the band 1408 having loops. Such engagement is rapidly removable and not likely to degrade over prolonged usage. An installed leak detection system 1410 having a hook and loop engagement as an attachment element 120 is illustrated in FIG. 14.

Still referring to FIG. 14, in an embodiment, the attachment element 120 may include a system that does not extend around the entire circumference of the fluid conduit 1400. For example, the leak detection system 100 may be secured to the fluid conduit by an adhesive-backed material 1412. In a particular embodiment, the adhesive-backed material 1412 may be integral to the leak detection system 100. In another particular embodiment, the adhesive-backed material 1412 may be a discrete element attached to the leak detection system 100. As used herein, "discrete element" refers to a distinct component that is, or was at a previous time, separable from other objects upon application of a nominal force. An installed leak detection system 1414 having an adhesive-backed material 1412 as an attachment element 120 is illustrated in FIG. 14.

In another embodiment, the attachment element 120 may include a securing layer (not illustrated) disposed between the leak detection system 100 and the fluid conduit 1400. The securing layer may include a paste, a gel, a putty, a material having a high plasticity, an epoxy, a solution, or any other substance which may be applied to one or both of the fluid conduit 1400 or leak detection system 100. Upon curing, the securing layer can prevent removal of the leak detection system 100. An installed leak detection system 1416 having a securing layer as an attachment element 120 is illustrated in FIG. 14.

In an embodiment, the securing layer may be relaxable so as to permit removal of the leak detection system 100. For example, the securing layer may be softened or lose its adhesive properties upon introduction of a particular temperature, pressure, fluid interaction, or light type. Thus, a user can selectively disengage the leak detection system 100 from the fluid conduit 1400.

In still another embodiment, the attachment element 120 may include a clamp 1418. The clamp 1418 may extend at least partially over or partially through the leak detection system 100, providing a radially inward compressive force thereagainst. In an embodiment, the clamp 1418 may include two halves—a first half 1420 and a second half 1422—adapted to couple together to secure the leak detection system 100 relative to the fluid conduit 1400. An installed leak detection system 1424 having a clamp 1418 as an attachment element 120 is illustrated in FIG. 14.

Figure 15:
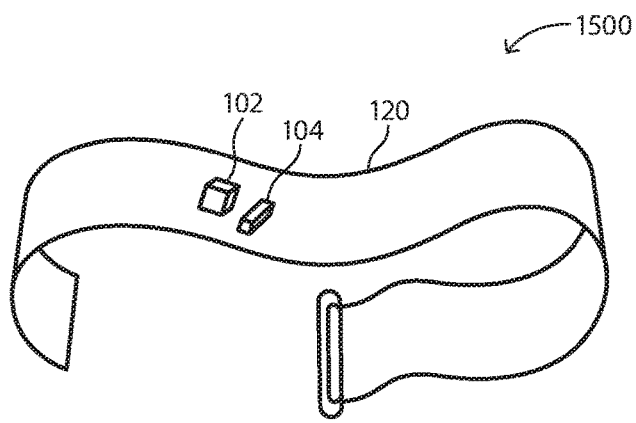
FIG. 15 includes a perspective view of a leak detection system in accordance with an embodiment.

Referring now to FIG. 15, in accordance with an embodiment, the attachment element 120 may form the substrate onto which the sensor 102 and communication device 104 are disposed. That is, a leak detection system 1500 in accordance with an embodiment can include the sensor 102 and communication device 104 directly coupled to the attachment element 120. In a particular embodiment, direct coupling of the sensor 102 and communication device 104 with the attachment element 120 may reduce weight of the leak detection system 1500 as compared to a previously described leak detection system 100. Additionally, the leak detection system 1500 may position the sensor 102 closer to the fluid interface 114 (FIG. 2) as compared to the leak detection system 100. In a particular embodiment, the attachment element 120 may include a material having a high fluid transfer rate as described above with respect to the substrate 302. This may accelerate fluid transmission to the sensor 102, thus decreasing lag time from occurrence of a leak until notification to a user or system which may then take steps to correct the leak.

As illustrated, the leak detection system 1500 may be disposed along a surface of the attachment element 120. In another embodiment, the leak detection system 1500 may be at least partially embedded in the attachment element 120. In yet another embodiment, the leak detection system 1500 may be fully embedded in the attachment element 120 such that the sensor 102 is not visible. In a particular embodiment, at least one of the sensor 102 and communication device 104 may be at least partially visible through the attachment element 120.

Figure 16:
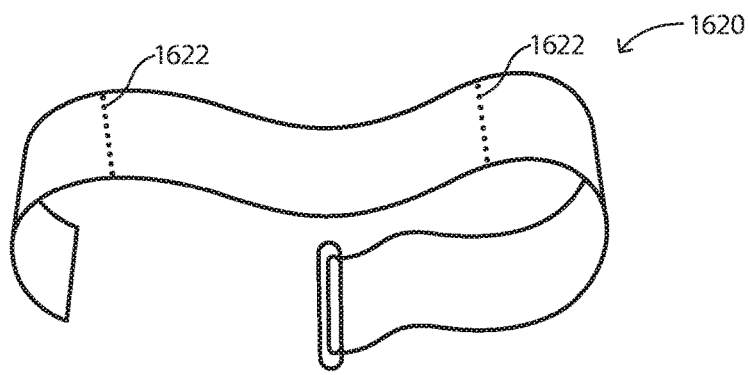
FIG. 16 includes a perspective view of an attachment element in accordance with an embodiment.

FIG. 16 illustrates an attachment element 1620 having a plurality of frangible portions 1622. The frangible portions 1622 may permit resizing of the attachment element 1620. That is, the frangible portions may be selectively ruptured to adjust a length of the attachment element 1620. In this regard, the attachment element 1620 may have an initial length, as measured prior to use, and an operational length, as measured prior to attachment, where the operational length is no greater than the initial length, such as less than the initial length.

In a non-illustrated embodiment, the attachment element may include only one frangible portion. In other embodiments, the attachment element may include at least 2 frangible portions, at least 3 frangible portions, at least 4 frangible portions, at least 5 frangible portions, at least 6 frangible portions, at least 7 frangible portions, at least 8 frangible portions, at least 9 frangible portions, or at least 10 frangible portions. In an embodiment, the attachment element may include no more than 1000 frangible portions.

Each frangible portion may include a structurally weakened portion of the attachment element. For example, the frangible portion may be defined by one or more apertures passing through the attachment element. The apertures may extend at least partially through a thickness of the attachment element. In a more particular embodiment, the apertures may extend fully through the thickness of the attachment element. The apertures may transverse the attachment element, interspaced, for example, by portions of the attachment element. The frangible portion may rupture upon generation of sufficient force in a transverse, or generally transverse, direction with respect to the attachment element.

Referring again to FIG. 1, the leak detection system 100 can include power source 132 coupled to at least one of the sensor 102, the communication device 104, the substrate 106, or the attachment element 120. In a particular embodiment, the power source 132 may include a battery or other charge storing device. In a more particular embodiment, the power source 132 may be rechargeable, for example by 120V power supply. The power source 132 may be removable from the leak detection system 100 to permit replacement thereof.

In an embodiment, the leak detection system 100 can receive power from an electrical outlet. The leak detection system 100 may include a conductive wire extending from an element on the leak detection system 100 and terminating in a plug adapted to be inserted into a wall outlet. In this regard, the leak detection system 100 can receive a constant flow of current, eliminating the need to charge or monitor electrical supply to the leak detection system 100.

Figure 17:
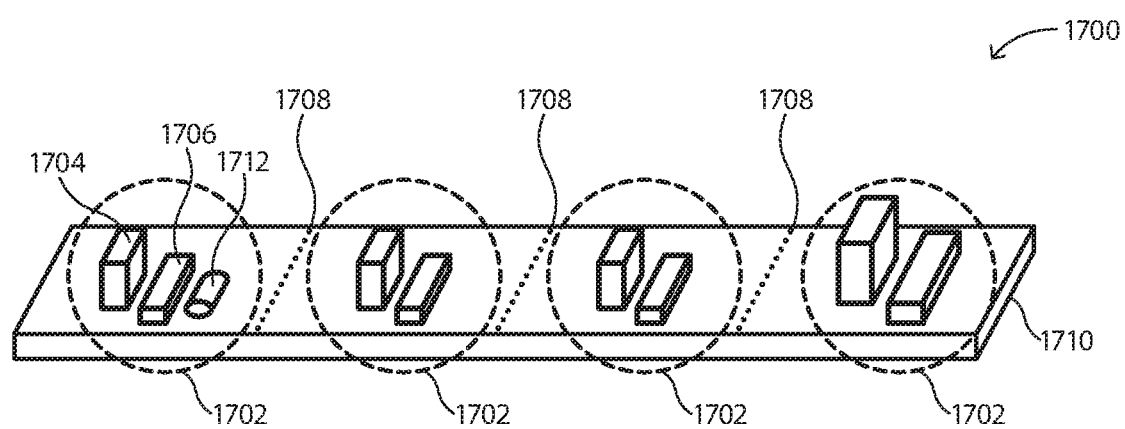
FIG. 17 includes a perspective view of a leak detection array in accordance with an embodiment.

FIG. 17 includes a leak detection array 1700 having a plurality of leak detection systems 1702 disposed on a length of material 1710. The material 1710 may include a fabric, such a woven or nonwoven fabric, a film, or another suitable substrate formed from a textile, polymer, metal, alloy, or other suitable material. In a particular embodiment, the material 1710 may be flexible, permitting the leak detection array 1700 to bend.

Each leak detection system 1702 may include one or more features from the previously described leak detection systems 100, 1402, 1406, 1410, 1414, 1416, 1424, and 1500. In particular, each leak detection system 1702 includes a sensor 1704 and a communication device 1706. In an embodiment, the leak detection systems 1702 may be identical to one another. For example, a first leak detection system and a second leak detection system of the leak detection systems 1702 may be identical to one another. In another embodiment, the leak detection systems 1702 may be different from one another. For example, a first leak detection system of the leak detection systems 1702 may be different from a third leak detection system of the leak detection systems 1702. In another embodiment, at least two of the leak detection systems 1702 may include different leak detection systems previously described herein. That is, the leak detection systems 1702 of the leak detection array 1700 may operate differently than one another. For example, a first leak detection system of the leak detection array 1700 may be similar to that illustrated in FIG. 4 while a second leak detection system of the leak detection array 1700 may be similar to that illustrated in FIGS. 11 and 12.

In an embodiment, the leak detection array 1700 is dividable into n-divisible sections, where n is the number of leak detection systems 1702 in the leak detection array 1700. Thus, for example, leak detection arrays 1700 with four leak detection systems 1702 (as illustrated in FIG. 17) include 4 dividable sections. In a particular instance, the leak detection array 1700 can include at least 2 leak detection systems, at least 3 leak detection systems, at least 4 leak detection systems, at least 5 leak detection systems, at least 10 leak detection systems, at least 20 leak detection systems, at least 50 leak detection systems, or at least 100 leak detection systems. In an embodiment, the leak detection array 1700 can include no greater than 10,000 leak detection systems 1702.

Frangible portions 1708 disposed between adjacent leak detection systems 1702 may facilitate easier division of the adjacent leak detection systems 1702 and 1702. That is, the frangible portions 1708 may permit a user to selectively tear off a discrete leak detection system 1702 from the leak detection array 1700. In an embodiment, the frangible portions 1708 may rupture upon application of a force of at least 1 N, at least 2 N, at least 5 N, at least 10 N, or at least 100 N. In another embodiment, the frangible portions 1708 may rupture upon application of a force of no greater than 10,000 N, no greater than 1000 N, or no greater than 125 N.

Each of the leak detection systems 1702 may be adapted to operate independently of the other leak detection systems 1702 of the leak detection array 1700. That is, each leak detection system 1702 may be self-sustaining and self-sufficient—requiring no further outside component for effective operation. In an embodiment, the leak detection systems 1702 may operate independently of one another or in smaller groups of leak detection arrays 1700, such as for example, two leak detection systems 1702 connected together.

In an embodiment, at least one of the leak detection systems 1702 can further include a power source 1712 coupled to at least one of the sensor 1704 and communication device 1706. In a particular embodiment, the power source 1712 may self-activate (i.e., generate current flow) upon rupture of the adjacent frangible portion 1708. This may preserve the power source 1712 until the at least one leak detection system 1702 is ready to be installed.

It is contemplated that the leak detection array 1700 may be rolled and stored in a housing, accessible through an opening therein. A user may grasp an exposed portion of the leak detection array to unwind the roll. Upon unwinding a suitable number of leak detection systems 1702, the user may tear the respective frangible portion 1708, separating the suitable leak detection systems 1702 from the remaining leak detection array 1700.

Leak detection systems and arrays as described herein may be used on various equipment for fluid leakage monitoring. Exemplary equipment may be found in electronic device fabrication such as in the semiconductor and superconductor industry; medical devices such as fluid transport lines and pumps; pipe couplings such as those found in the oil and gas industry, potable water systems, and sewers; aerospace industry; food and beverage industry; and automotive industry.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A leak detection system comprising:
a sensor having a first condition when dry and a second condition when wet;
a communication device operatively coupled to the sensor; and
an attachment element adapted to attach the leak detection system to an area for monitoring fluid leakage, wherein the attachment element is removable, reusable, or both.

Embodiment 2

A leak detection system comprising:
a sensor comprising:
  a substrate adapted to change in response to fluid contact;
  an element in communication with the substrate and adapted to have a first condition when the substrate is dry and a second condition when the substrate is wet;
a communication device operatively coupled to the sensor and adapted to send a signal to a receiving device when the element is in the first condition, in the second condition, or both; and
an attachment element adapted to attach the leak detection system to an area for monitoring fluid leakage.

Embodiment 3

A leak detection system comprising:
a sensor comprising:
  a substrate adapted to change between a first size when dry and a second size when wet, the first and second sizes being different from one another; and
  a detection system in communication with the substrate and adapted to monitor the substrate for changes between the first and second sizes;
a communication device operatively coupled to the sensor and adapted to send a signal to a receiving device when the detection system detects the first size, the second size, or both; and
an attachment element adapted to attach the leak detection system to an area for monitoring fluid leakage.

Embodiment 4

A leak detection system comprising:
a sensor comprising:
  a substrate adapted to have a first size when dry and a second size when wet, the first and second sizes being different from one another;
  a first element disposed at a first location of the substrate; and
  a second element disposed at a second location of the substrate, the second location being different than the first location;
a communication device operatively coupled to the sensor and adapted to send a signal to a receiving device when a distance between the first and second elements changes; and
an attachment element adapted to attach the leak detection system to an area for monitoring fluid leakage.

Embodiment 5

A leak detection array comprising:
a length of material having a number of leak detection systems, each leak detection system comprising:
  a sensor; and
  a communication device operatively coupled to the sensor,
wherein the length of material is dividable into n-divisible sections, where n is the number of leak detection systems in the leak detection array.

Embodiment 6

A leak detection array comprising a plurality of leak detection systems disposed on a length of material, wherein at least one of the leak detection systems is removable from the leak detection array and engageable with a fluid system.

Embodiment 7

A fluid system comprising:
an equipment having a fluid; and
a leak detection system attached to the equipment, the leak detection system comprising:
  a sensor having a first condition when dry and a second condition when wet;
  a communication device operatively coupled to the sensor and adapted to send a signal to a receiving device when the sensor senses a fluid leakage; and
  an attachment element adapted to attach the leak detection system to an area for monitoring fluid leakage.

Embodiment 8

An equipment for making an electronic device, the equipment comprising:
an equipment adapted to receive a fluid used in making the electronic device; and
a leak detection system attached to the equipment, the leak detection system comprising:
  a sensor having a first condition when dry and a second condition when wet;
  a communication device operatively coupled to the sensor and adapted to send a signal to a receiving device when the sensor senses a fluid leakage; and
  an attachment element adapted to attach the leak detection system to an area for monitoring fluid leakage.

Embodiment 9

A pipe joint comprising:
a first pipe;
a second pipe coupled to the first pipe at an interface; and
a leak detection system attached to at least one of the first and second pipes and disposed adjacent to the interface, wherein the leak detection system comprises:
  a sensor having a first condition when dry and a second condition when wet;
  a communication device operatively coupled to the sensor and adapted to send a signal to a receiving device when the sensor senses a fluid leakage; and an attachment element adapted to attach the leak detection system to at least one of the first and second pipes to monitor fluid leakage at the interface.

Embodiment 10

The leak detection system, leak detection array, fluid system, equipment, or pipe joint according to any one of the preceding embodiments, wherein the sensor comprises:
a substrate; and
a detection element in communication with the substrate.

Embodiment 11

The leak detection system, leak detection array, fluid system, equipment, or pipe joint according to embodiment 10, wherein the substrate is adapted to change in response to fluid contact.

Embodiment 12

The leak detection system, leak detection array, fluid system, equipment, or pipe joint according to any one of embodiments 10 and 11, wherein the substrate is adapted to change between a first size when dry and a second size when wet, the first and second sizes being different from one another.

Embodiment 13

The leak detection system, leak detection array, fluid system, equipment, or pipe joint according to embodiment 12, wherein the first size is smaller than the second size.

Embodiment 14

The leak detection system, leak detection array, fluid system, equipment, or pipe joint according to any one of embodiments 10-13, wherein at least a portion of the substrate comprises an expandable material adapted to expand upon contact with fluid.

Embodiment 15

The leak detection system, leak detection array, fluid system, equipment, or pipe joint according to any one of embodiments 10-14, wherein at least a portion of the substrate comprises a temperature reactive material adapted to change in temperature upon contact with fluid.

Embodiment 16

The leak detection system, leak detection array, fluid system, equipment, or pipe joint according to any one of embodiments 10-15, wherein at least a portion of the substrate comprises a luminescence reactive material adapted to change in luminescence upon contact with fluid.

Embodiment 17

The leak detection system, leak detection array, fluid system, equipment, or pipe joint according to any one of embodiments 10-16, wherein at least a portion of the substrate comprises a fluorescence reactive material adapted to change in fluorescence upon contact with fluid.

Embodiment 18

The leak detection system, leak detection array, fluid system, equipment, or pipe joint according to any one of embodiments 10-17, wherein at least a portion of the substrate comprises an incandescence reactive material adapted to change in incandescence upon contact with fluid.

Embodiment 19

The leak detection system, leak detection array, fluid system, equipment, or pipe joint according to any one of embodiments 10-18, wherein the detection element is adapted to detect a change in condition of the substrate.

Embodiment 20

The leak detection system, leak detection array, fluid system, equipment, or pipe joint according to any one of embodiments 10-19, wherein the detection element is adapted to detect a change in luminescence of the substrate, a change in fluorescence of the substrate, a change in incandescence of the substrate, a change in temperature of the substrate, a change in size of the substrate, or a change in pressure of the substrate.

Embodiment 21

The leak detection system, leak detection array, fluid system, equipment, or pipe joint according to any one of embodiments 10-20, wherein the detection element is attached to the substrate.

Embodiment 22

The leak detection system, leak detection array, fluid system, equipment, or pipe joint according to any one of embodiments 10-21, wherein the detection element is attached to the substrate by an adhesive.

Embodiment 23

The leak detection system, leak detection array, fluid system, equipment, or pipe joint according to any one of embodiments 10-22, wherein the detection element is attached to the substrate by a mechanical fastener or a threaded or non-threaded fastener.

Embodiment 24

The leak detection system, leak detection array, fluid system, equipment, or pipe joint according to any one of embodiments 10-23, wherein the detection element comprises at least one of an optical sensor, a thermocouple, and a pressure transducer.

Embodiment 25

The leak detection system, leak detection array, fluid system, equipment, or pipe joint according to any one of embodiments 10-24, wherein the detection element comprises at least two detection elements.

Embodiment 26

The leak detection system, leak detection array, fluid system, equipment, or pipe joint according to embodiment 25, wherein each of the at least two detection elements is adapted to detect a different condition of the substrate.

Embodiment 27

The leak detection system, leak detection array, fluid system, equipment, or pipe joint according to any one of embodiments 10-26, wherein the detection element comprises an electrical circuit.

Embodiment 28

The leak detection system, leak detection array, fluid system, equipment, or pipe joint according to any one of embodiments 10-27, wherein the detection element comprises an open circuit in the dry state, and wherein the open circuit is closed upon contact with fluid.

Embodiment 29

The leak detection system, leak detection array, fluid system, equipment, or pipe joint according to embodiment 28, wherein the fluid is conductive.

Embodiment 30

The leak detection system, leak detection array, fluid system, equipment, or pipe joint according to any one of embodiments 10-27, wherein the detection element comprises a closed circuit in the dry state, and wherein the closed circuit is disrupted or broken upon contact with fluid.

Embodiment 31

The leak detection system, leak detection array, fluid system, equipment, or pipe joint according to embodiment 30, wherein the fluid is corrosive.

Embodiment 32

The leak detection system, leak detection array, fluid system, equipment, or pipe joint according to any one of embodiments 10-31, wherein the detection element comprises a material, wherein the material has an effective length, $L_D$, as measured in the dry state and an effective length, $L_W$, as measured in the wet state, and wherein $L_D$ is different than $L_W$.

Embodiment 33

The leak detection system, leak detection array, fluid system, equipment, or pipe joint according to embodiment 32, wherein $L_W$ is greater than $L_D$.

Embodiment 34

The leak detection system, leak detection array, fluid system, equipment, or pipe joint according to any one of embodiments 32 and 33, wherein $L_W$ is at least 1.01 $L_D$, at least 1.05 $L_D$, at least 1.1 $L_D$, at least 1.2 $L_D$, at least 1.3 $L_D$, at least 1.4 $L_D$, at least 1.5 $L_D$, at least 1.6 $L_D$, at least 1.7 $L_D$, at least 1.8 $L_D$, at least 1.9 $L_D$, or even at least 2.0 $L_D$.

Embodiment 35

The leak detection system, leak detection array, fluid system, equipment, or pipe joint according to any one of embodiments 32-34, wherein $L_W$ is no greater than 100 $L_D$, no greater than 50 $L_D$, no greater than 25 $L_D$, no greater than 10 $L_D$, or even no greater than 5 $L_D$.

Embodiment 36

The leak detection system, leak detection array, fluid system, equipment, or pipe joint according to any one of embodiments 32-35, wherein the material comprises an electrically conductive material, such as a wire.

Embodiment 37

The leak detection system, leak detection array, fluid system, equipment, or pipe joint according to any one of embodiments 32-36, wherein a resistivity of the material changes in response to a changing effective length thereof.

Embodiment 38

The leak detection system, leak detection array, fluid system, equipment, or pipe joint according to any one of embodiments 32-37, wherein a resistivity of the material increases as the effective length increases.

Embodiment 39

The leak detection system, leak detection array, fluid system, equipment, or pipe joint according to any one of embodiments 32-38, wherein the effective length of the material is dependent on the size of the substrate.

Embodiment 40

The leak detection system, leak detection array, fluid system, equipment, or pipe joint according to any one of embodiments 27-39, wherein the electrical circuit further comprises a resistor, a capacitor, an inductor, a transistor, or any combination thereof.

Embodiment 41

The leak detection system, leak detection array, fluid system, equipment, or pipe joint according to any one of embodiments 10-40, wherein the detection element further comprises a first element disposed at a first location of the substrate and a second element disposed at a second location of the substrate, wherein the first and second elements are separated by a distance, $D_D$, as measured in the dry state and a distance, $D_W$, as measured in the wet state, and wherein $D_D$ is different than $D_W$.

Embodiment 42

The leak detection system, leak detection array, fluid system, equipment, or pipe joint according to embodiment 41, wherein $D_W$ is greater than $D_D$.

Embodiment 43

The leak detection system, leak detection array, fluid system, equipment, or pipe joint according to any one of embodiments 41 and 42, wherein electromagnetic forces of the detection element as measured when the first and second elements are separated by $D_D$ are different than when the first and second elements are separated by $D_W$.

Embodiment 44

The leak detection system, leak detection array, fluid system, equipment, or pipe joint according to any one of embodiments 41-43, wherein an electromagnetic interaction between the first and second elements is adapted to decrease as the distance between the first and second elements increases.

Embodiment 45

The leak detection system, leak detection array, fluid system, equipment, or pipe joint according to any one of embodiments 41-44, wherein the first element comprises a conductive bar.

Embodiment 46

The leak detection system, leak detection array, fluid system, equipment, or pipe joint according to any one of embodiments 41-45, wherein the second element comprises a conductive bar.

Embodiment 47

The leak detection system, leak detection array, fluid system, equipment, or pipe joint according to any one of embodiments 41-46, wherein the first and second bars have a generally same shape as compared to one another.

Embodiment 48

The leak detection system, leak detection array, fluid system, equipment, or pipe joint according to any one of embodiments 41-46, wherein the first and second bars have a different shape as compared to one another.

Embodiment 49

The leak detection system, leak detection array, fluid system, equipment, or pipe joint according to any one of embodiments 10-48, wherein the substrate comprises a first major surface and a second major surface separated by a thickness, $T_S$, of the substrate.

Embodiment 50

The leak detection system, leak detection array, fluid system, equipment, or pipe joint according to embodiment 49, wherein $T_S$ is at least 0.01 inches, at least 0.1 inches, at least 0.2 inches, or even at least 0.3 inches Embodiment 51

The leak detection system, leak detection array, fluid system, equipment, or pipe joint according to any one of embodiments 10-50, wherein the detection element is disposed along a major surface of the substrate.

Embodiment 52

The leak detection system, leak detection array, fluid system, equipment, or pipe joint according to any one of embodiments 10-51, wherein the detection element is disposed at a central position of the substrate.

Embodiment 53

The leak detection system, leak detection array, fluid system, equipment, or pipe joint according to any one of embodiments 10-51, wherein the detection element is disposed at a peripheral portion of the substrate.

Embodiment 54

The leak detection system, leak detection array, fluid system, equipment, or pipe joint according to any one of embodiments 10-53, wherein a surface area of the substrate occupied by the detection element is less than 50% of a total surface area of the substrate, less than 40% of the total surface area of the substrate, less than 30% of the total surface area of the substrate, less than 20% of the total surface area of the substrate, less than 10% of the total surface area of the substrate, or less than 1% of the total surface area of the substrate.

Embodiment 55

The leak detection system, leak detection array, fluid system, equipment, or pipe joint according to any one of embodiments 10-54, wherein the detection element is at least partially embedded within the substrate.

Embodiment 56

The leak detection system, leak detection array, fluid system, equipment, or pipe joint according to any one of embodiments 10-55, wherein the detection element is fully embedded within the substrate.

Embodiment 57

The leak detection system, leak detection array, fluid system, equipment, or pipe joint according to any one of embodiments 10-56, wherein at least a portion of the detection element is not visible from an outer surface of the substrate.

Embodiment 58

The leak detection system, leak detection array, fluid system, equipment, or pipe joint according to any one of embodiments 10-57, wherein at least a portion of the detection element is visible from an outer surface of the substrate.

Embodiment 59

The leak detection system, leak detection array, fluid system, equipment, or pipe joint according to any one of embodiments 10-58, wherein the sensor is adapted to be disposed on a surface such that the substrate is between the detection element and the surface.

Embodiment 60

The leak detection system, leak detection array, fluid system, equipment, or pipe joint according to any one of embodiments 10-58, wherein the sensor is adapted to be disposed on a surface such that the detection element is between the substrate and the surface.

Embodiment 61

The leak detection system, leak detection array, fluid system, equipment, or pipe joint according to any one of embodiments 10-60, wherein the substrate is flexible.

Embodiment 62

The leak detection system, leak detection array, fluid system, equipment, or pipe joint according to any one of embodiments 10-61, wherein the substrate is generally planar in a relaxed state

Embodiment 63

The leak detection system, leak detection array, fluid system, equipment, or pipe joint according to any one of embodiments 10-61, wherein the substrate has a generally arcuate cross section.

Embodiment 64

The leak detection system, leak detection array, fluid system, equipment, or pipe joint according to embodiment 63, wherein the substrate has a radius of curvature, R, of at least 1 inch, at least 2 inches, at least 3 inches, at least 4 inches, at least 5 inches, at least 6 inches, at least 12 inches, at least 24 inches, or even at least 48 inches.

Embodiment 65

The leak detection system, leak detection array, fluid system, equipment, or pipe joint according to any one of embodiments 10-64, wherein the sensor is adapted to perceive a fluid leakage of at least 0.0001 mL, at least 0.001 mL, at least 0.01 mL, at least 0.05 mL, or at least 0.1 mL.

Embodiment 66

The leak detection system, leak detection array, fluid system, equipment, or pipe joint according to any one of embodiments 10-65, wherein the sensor is adapted to recognize a fluid leak upon contact with 0.0001 mL, 0.001 mL, 0.01 mL, 0.05 mL, or 0.1 mL.

Embodiment 67

The leak detection system, leak detection array, fluid system, equipment, or pipe joint according to any one of the preceding embodiments, wherein the leak detection system comprises a communication device operatively coupled to the sensor.

Embodiment 68

The leak detection system, leak detection array, fluid system, equipment, or pipe joint according to embodiment 67, wherein the communication device is coupled to the sensor.

Embodiment 69

The leak detection system, leak detection array, fluid system, equipment, or pipe joint according to any one of embodiments 67 and 68, wherein the communication device is coupled to the substrate.

Embodiment 70

The leak detection system, leak detection array, fluid system, equipment, or pipe joint according to any one of embodiments 67-69, wherein the communication device is adapted to operate using a wireless protocol.

Embodiment 71

The leak detection system, leak detection array, fluid system, equipment, or pipe joint according to any one of embodiments 67-69, wherein the communication device is adapted to operate using a wired protocol.

Embodiment 72

The leak detection system, leak detection array, fluid system, equipment, or pipe joint according to embodiment 71, wherein the communication device is adapted to operate using a local area network (LAN).

Embodiment 73

The leak detection system, leak detection array, fluid system, equipment, or pipe joint according to any one of embodiments 71 and 72, wherein the communication device is adapted to operate using an HTML or HTMLS protocol.

Embodiment 74

The leak detection system, leak detection array, fluid system, equipment, or pipe joint according to any one of embodiments 67-73, wherein the communication device is adapted to send a signal to a receiving device when the sensor senses a fluid leakage.

Embodiment 75

The leak detection system, leak detection array, fluid system, equipment, or pipe joint according to any one of embodiments 67-74, wherein the communication device is wirelessly connected to the sensor.

Embodiment 76

The leak detection system, leak detection array, fluid system, equipment, or pipe joint according to any one of embodiments 67-75, wherein the communication device is connected to the sensor by a wire.

Embodiment 77

The leak detection system, leak detection array, fluid system, equipment, or pipe joint according to any one of embodiments 67-76, wherein the communication device has a continuous operation.

Embodiment 78

The leak detection system, leak detection array, fluid system, equipment, or pipe joint according to any one of embodiments 67-76, wherein the communication device has a selective operation.

Embodiment 79

The leak detection system, leak detection array, fluid system, equipment, or pipe joint according to any one of embodiments 67-78, wherein the communication device is exposed along the leak detection system.

Embodiment 80

The leak detection system, leak detection array, fluid system, equipment, or pipe joint according to any one of embodiments 67-79, wherein the communication device is removable from the leak detection system.

Embodiment 81

The leak detection system, leak detection array, fluid system, equipment, or pipe joint according to any one of embodiments 67-80, wherein the communication device is replaceable.

Embodiment 82

The leak detection system, leak detection array, fluid system, equipment, or pipe joint according to any one of the preceding embodiments, wherein the leak detection system further comprises:
an attachment element adapted to attach the leak detection system to an area for monitoring fluid leakage.

Embodiment 83

The leak detection system, leak detection array, fluid system, equipment, or pipe joint according to embodiment 82, wherein the attachment element is coupled with the sensor and the communication device.

Embodiment 84

The leak detection system, leak detection array, fluid system, equipment, or pipe joint according to any one of embodiments 82 and 83, wherein the attachment element is releasably coupled with the sensor, the communication device, or both.

Embodiment 85

The leak detection system, leak detection array, fluid system, equipment, or pipe joint according to any one of embodiments 82-84, wherein the attachment element is removably engageable with the area for monitoring fluid leakage.

Embodiment 86

The leak detection system, leak detection array, fluid system, equipment, or pipe joint according to any one of embodiments 82-85, wherein the attachment element comprises a multipiece construction.

Embodiment 87

The leak detection system, leak detection array, fluid system, equipment, or pipe joint according to any one of embodiments 82-86, wherein the attachment element comprises at least two components, and wherein the two components are engageable with one another so as to engage the area for monitoring fluid leakage.

Embodiment 88

The leak detection system, leak detection array, fluid system, equipment, or pipe joint according to any one of embodiments 82-87, wherein the attachment element comprises an adhesive.

Embodiment 89

The leak detection system, leak detection array, fluid system, equipment, or pipe joint according to any one of embodiments 81-88, wherein the attachment element comprises an adhesive tape.

Embodiment 90

The leak detection system, leak detection array, fluid system, equipment, or pipe joint according to any one of embodiments 81-89, wherein the attachment element comprises a fabric, such as a woven fabric or nonwoven fabric.

Embodiment 91

The leak detection system, leak detection array, fluid system, equipment, or pipe joint according to any one of embodiments 81-90, wherein the attachment element comprises a rope, a cord, a string, or any other similar elongated object.

Embodiment 92

The leak detection system, leak detection array, fluid system, equipment, or pipe joint according to any one of embodiments 81-91, wherein the attachment element comprises a hook and loop engagement system.

Embodiment 93

The leak detection system, leak detection array, fluid system, equipment, or pipe joint according to embodiment 92, wherein the attachment element is an elongated object having a first portion and a second portion, the first portion including a plurality of hooks and the second portion including a plurality of loops adapted to engage with the plurality of hooks.

Embodiment 94

The leak detection system, leak detection array, fluid system, equipment, or pipe joint according to any one of embodiments 81-93, wherein the attachment element comprises a ratcheting tie system, such as a cable tie.

Embodiment 95

The leak detection system, leak detection array, fluid system, equipment, or pipe joint according to any one of embodiments 81-94, wherein the attachment element comprises a threaded fastener, such as a threaded nut.

Embodiment 96

The leak detection system, leak detection array, fluid system, equipment, or pipe joint according to any one of embodiments 81-95, wherein the attachment element comprises a material having a high plasticity, such as putty.

Embodiment 97

The leak detection system, leak detection array, fluid system, equipment, or pipe joint according to embodiment 96, wherein the material is an epoxy.

Embodiment 98

The leak detection system, leak detection array, fluid system, equipment, or pipe joint according to any one of embodiments 81-97, wherein the attachment element comprises a clamp.

Embodiment 99

The leak detection system, leak detection array, fluid system, equipment, or pipe joint according to embodiment 98, wherein the clamp comprises a first half and a second half, the first and second halves adapted to couple together to secure the attachment element to the area for monitoring fluid leakage.

Embodiment 100

The leak detection system, leak detection array, fluid system, equipment, or pipe joint according to any one of embodiments 81-99, wherein the attachment element is elastically deformable.

Embodiment 101

The leak detection system, leak detection array, fluid system, equipment, or pipe joint according to any one of embodiments 81-100, wherein the attachment element has an unloaded size, $S_U$, as measured at rest, and a loaded size, $S_L$, as measured under loading conditions, and wherein $S_L$ is at least 1.01 $S_U$, at least 1.1 $S_U$, at least 1.5 $S_U$, at least 2.0 $S_U$, at least 5.0 $S_U$, at least 10.0 $S_U$, or even at least 25 $S_U$.

Embodiment 102

The leak detection system, leak detection array, fluid system, equipment, or pipe joint according to any one of embodiments 81-101, wherein at least a portion of the sensor is embedded within the attachment element.

Embodiment 103

The leak detection system, leak detection array, fluid system, equipment, or pipe joint according to any one of embodiments 81-102, wherein the entire sensor is embedded within the attachment element.

Embodiment 104

The leak detection system, leak detection array, fluid system, equipment, or pipe joint according to any one of embodiments 81-103, wherein at least a portion of the sensor is visible through the attachment element.

Embodiment 105

The leak detection system, leak detection array, fluid system, equipment, or pipe joint according to any one of embodiments 81-103, wherein the sensor is not visible through the attachment element.

Embodiment 106

The leak detection system, leak detection array, fluid system, equipment, or pipe joint according to any one of embodiments 81-105, wherein the attachment element is reusable, reengageable, or reattachable.

Embodiment 107

The leak detection system, leak detection array, fluid system, equipment, or pipe joint according to any one of embodiments 81-106, wherein the attachment element has an initial length, as measured prior to use, and an operational length, as measured prior to attachment, and wherein the operational length is no greater than the initial length.

Embodiment 108

The leak detection system, leak detection array, fluid system, equipment, or pipe joint according to embodiment 107, wherein the operational length is less than the initial length.

Embodiment 109

The leak detection system, leak detection array, fluid system, equipment, or pipe joint according to any one of embodiments 81-108, wherein the attachment element is resizable.

Embodiment 110

The leak detection system, leak detection array, fluid system, equipment, or pipe joint according to any one of embodiments 81-109, wherein the attachment element comprises a frangible portion permitting resizing thereof.

Embodiment 111

The leak detection system, leak detection array, fluid system, equipment, or pipe joint according to any one of embodiments 81-110, wherein the attachment element has a uniform width, as measured along a length thereof.

Embodiment 112

The leak detection system, leak detection array, fluid system, equipment, or pipe joint according to any one of embodiments 81-111, wherein the attachment element comprises a length, L, as measured by a longest dimension of the attachment element, a thickness, T, as measured by a shortest dimension of the attachment element, and a width, W, as measured by a middle dimension of the attachment method, and wherein L is at least 1.5 W, at least 2.0 W, at least 5.0 W, at least 10.0 W, at least 50.0 W, or even at least 100.0 W.

Embodiment 113

The leak detection system, leak detection array, fluid system, equipment, or pipe joint according to any one of embodiments 81-112, wherein the sensor comprises a detection element, and wherein the detection element is at least partially embedded within the attachment element.

Embodiment 114

The leak detection system, leak detection array, fluid system, equipment, or pipe joint according to any one of the preceding embodiments, wherein the leak detection system further comprises a power source.

Embodiment 115

The leak detection system, leak detection array, fluid system, equipment, or pipe joint according to embodiment 114, wherein the power source comprises a battery.

Embodiment 116

The leak detection system, leak detection array, fluid system, equipment, or pipe joint according to any one of embodiments 114 and 115, wherein the power source is rechargeable.

Embodiment 117

The leak detection system, leak detection array, fluid system, equipment, or pipe joint according to any one of embodiments 114-116, wherein the power source is removable from the leak detection system.

Embodiment 118

The leak detection system, leak detection array, fluid system, equipment, or pipe joint according to any one of embodiments 114-117, wherein the power source is coupled to the sensor.

Embodiment 119

The leak detection system, leak detection array, fluid system, equipment, or pipe joint according to any one of embodiments 114-118, wherein the power source is coupled to the communication device.

Embodiment 120

The leak detection system, leak detection array, fluid system, equipment, or pipe joint according to any one of the preceding embodiments, wherein the leak detection system is part of a leak detection array.

Embodiment 121

The leak detection system, leak detection array, fluid system, equipment, or pipe joint according to embodiment 120, wherein the leak detection array comprises a plurality of leak detection systems.

Embodiment 122

The leak detection system, leak detection array, fluid system, equipment, or pipe joint according to any one of embodiments 120 and 121, wherein the leak detection array is dividable into n-divisible sections, where n is the number of leak detection systems in the leak detection array.

Embodiment 123

The leak detection system, leak detection array, fluid system, equipment, or pipe joint according to any one of embodiments 120-122, wherein the leak detection array comprises at least 2 leak detection systems, at least 3 leak detection systems, at least 4 leak detection systems, at least 5 leak detection systems, at least 10 leak detection systems, at least 20 leak detection systems, at least 50 leak detection systems, or at least 100 leak detection systems.

Embodiment 124

The leak detection system, leak detection array, fluid system, equipment, or pipe joint according to any one of embodiments 120-123, wherein the leak detection array comprises a length of material, and wherein the leak detection systems are disposed on the length of material.

Embodiment 125

The leak detection system, leak detection array, fluid system, equipment, or pipe joint according to embodiment 124, wherein the length of material comprises a woven or nonwoven fabric, or a film.

Embodiment 126

The leak detection system, leak detection array, fluid system, equipment, or pipe joint according to any one of embodiments 124 and 125, wherein the length of material comprises a frangible portion disposed between adjacent leak detection systems.

Embodiment 127

The leak detection system, leak detection array, fluid system, equipment, or pipe joint according to embodiment 126, wherein the frangible portion is adapted to rupture upon application of a pressure of at least 1 N, at least 2 N, at least 5 N, at least 10 N, or at least 100 N.

Embodiment 128

The leak detection system, leak detection array, fluid system, equipment, or pipe joint according to any one of embodiments 120-127, wherein the leak detection array comprises:
  a first leak detection system comprising:
    a sensor having a first condition when dry and a second condition when wet;
    a communication device operatively coupled to the sensor; and
    an attachment element adapted to attach the leak detection system to an area for monitoring fluid leakage; and
  a second leak detection system comprising:
    a sensor having a first condition when dry and a second condition when wet;
    a communication device operatively coupled to the sensor; and
    an attachment element adapted to attach the leak detection system to an area for monitoring fluid leakage,
  wherein the first and second leak detection systems are attached together, and wherein the first leak detection system and the second leak detection system are adapted to be used independent of one another.

Embodiment 129

The leak detection system, leak detection array, fluid system, equipment, or pipe joint according to any one of embodiments 120-128, wherein the leak detection array comprises a first leak detection system and a second leak detection system, and wherein the first and second leak detection systems are identical to one another.

Embodiment 130

The leak detection system, leak detection array, fluid system, equipment, or pipe joint according to any one of embodiments 120-128, wherein the leak detection array comprise a first leak detection system and a third leak detection system, and wherein the first and third leak detection systems are different from one another.

Embodiment 131

The leak detection system, leak detection array, fluid system, equipment, or pipe joint according to any one of embodiments 120-130, wherein each leak detection system of the leak detection array comprises an electrical interface adapted to couple the leak detection system to a power source, a logic element, or a combination thereof.

Embodiment 132

A method of using a leak detection system comprising:
providing a leak detection array comprising at least two leak detection systems;
separating a first leak detection system from the leak detection array, the first leak detection system comprising:
a sensor;
a communication device coupled to the sensor; and
an attachment element; and
attaching the first leak detection system to an area for monitoring fluid leakage.

Embodiment 133

The method according to embodiment 132, wherein the at least two leak detection systems are identical.

Embodiment 134

The method according to any one of embodiments 132 and 133, wherein the first leak detection system comprises a leak detection system described in any one of embodiments 1-131.

Embodiment 135

The leak detection system, leak detection array, fluid system, equipment, or pipe joint according to any one of the preceding embodiments, wherein the leak detection system is adapted to be disposed adjacent to a fluid interface on an equipment.

Embodiment 136

The leak detection system, leak detection array, fluid system, equipment, or pipe joint according to embodiment 135, wherein the equipment is used in fabricating electronic devices, such as semiconductors.

Embodiment 137

The leak detection system, leak detection array, fluid system, equipment, or pipe joint according to any one of embodiments 135 and 136, wherein the fluid interface is a junction between adjacent tubulars.

Embodiment 138

The leak detection system, leak detection array, fluid system, equipment, or pipe joint according to any one of embodiments 135-137, wherein the leak detection system is disposed on a portion of the fluid interface.

Embodiment 139

The leak detection system, leak detection array, fluid system, equipment, or pipe joint according to any one of embodiments 135-137, wherein the leak detection system is disposed on the entire fluid interface.

Embodiment 140

The leak detection system, leak detection array, fluid system, equipment, or pipe joint according to any one of embodiments 135-139, wherein the fluid interface is generally annular.

Embodiment 141

The leak detection system, leak detection array, fluid system, equipment, or pipe joint according to any one of embodiments 135-140, wherein the fluid interface has an internal fluid pressure of at least 1 PSI, at least 2 PSI, at least 3 PSI, at least 4 PSI, at least 5 PSI, at least 10 PSI, at least 20 PSI, at least 50 PSI, or at least 100 PSI.

Embodiment 142

The leak detection system, leak detection array, fluid system, equipment, or pipe joint according to any one of embodiments 135-141, wherein the fluid interface has an internal fluid pressure of no greater than 1000 PSI.

Embodiment 143

The leak detection system, leak detection array, fluid system, equipment, or pipe joint according to any one of embodiments 135-142, wherein the leak detection system is removably engageable with the equipment.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

The invention claimed is:

1. A leak detection system comprising: a length of material having a number of leak detection systems, each leak detection system comprising: a sensor; and a communication device operatively coupled to the sensor, wherein the length of material is dividable into n-divisible sections, where n is the number of leak detection systems in the leak detection array, wherein the sensor comprises at least one detection element; wherein an attachment element adapted to attach the leak detection system to an area for monitoring fluid leakage, wherein the attachment element is removable, reusable, or both, wherein the detection element comprises an electrical circuit comprising an electronic component comprising at least one of a resistor, a capacitor, an inductor, a transistor, or any combination thereof, wherein the electrical circuit comprises a continuous wire comprising a serpentine shape.

2. The leak detection system of claim 1, wherein the detection element comprises an electrical circuit.

3. The leak detection system of claim 1, wherein the sensor further comprises a substrate.

4. The leak detection system of claim 3, wherein the detection element is adapted to detect a change in condition of the substrate.

5. The leak detection system of claim 3, wherein the detection element is attached to the substrate.

6. The fluid system of claim 1, wherein the communication device is adapted to operate using a wireless protocol.

7. The leak detection system of claim 1, wherein the attachment element is removably engageable with the area for monitoring fluid leakage.

8. A leak detection array comprising:
a length of material having a number of leak detection systems, each leak detection system comprising:
a sensor; and
a communication device operatively coupled to the sensor,
wherein the length of material is dividable into n-divisible sections, where n is the number of leak detection systems in the leak detection array, wherein the sensor comprises at least one detection element, wherein the detection element comprises
an electrical circuit comprising an electronic component comprising at least one of a resistor, a capacitor, an inductor, a transistor, or any combination thereof, wherein the electrical circuit comprises a continuous wire comprising a serpentine shape.

9. A fluid system comprising: an equipment having a fluid and an attached length of material to the equipment having a number of leak detection systems, each leak detection system comprising: a sensor; and a communication device operatively coupled to the sensor, wherein the length of material is dividable into n-divisible sections, where n is the number of leak detection systems in the leak detection array, wherein the sensor comprises at least one detection element wherein an attachment element adapted to attach the leak detection system to an area for monitoring fluid leakage, wherein the attachment element is removable, reusable, or both, wherein the sensor comprises at least one detection element, wherein the detection element comprises an electrical circuit comprising electronic component comprising at least one of a resistor, a capacitor, an inductor, a transistor, or any combination thereof, wherein the electrical circuit comprises a continuous wire comprising a serpentine shape.

10. The leak detection system of claim 9, wherein the detection element comprises an electrical circuit.

11. The leak detection system of claim 9, wherein the sensor further comprises a substrate.

12. The leak detection system of claim 11, wherein the detection element is adapted to detect a change in condition of the substrate.

13. The leak detection system of claim 11, wherein the detection element is attached to the substrate.

14. The fluid system of claim 9, wherein the communication device is adapted to operate using a wireless protocol.

15. The fluid system of claim 9, wherein the communication device is adapted to operate using a local area network (LAN).

16. The fluid system of claim 9, wherein the attachment element is removably engageable with the area for monitoring fluid leakage.

17. The fluid system of claim 9, wherein the leak detection system is part of a leak detection array.

18. The fluid system of claim 17, wherein the leak detection array comprises a plurality of leak detection systems.

* * * * *